(12) United States Patent
Tola et al.

(10) Patent No.: US 11,483,143 B2
(45) Date of Patent: Oct. 25, 2022

(54) ENHANCED MONITORING AND PROTECTION OF ENTERPRISE DATA

(71) Applicant: SMART SECURITY SYSTEMS, LLC, Boulder, CO (US)

(72) Inventors: Kenneth C. Tola, Boulder, CO (US); Keith Withington, Carmine, TX (US)

(73) Assignee: Smart Security Systems, LLC, Boulder, CO (US)

(*) Notice: Subject to any disclaimer, the term of this patent is extended or adjusted under 35 U.S.C. 154(b) by 0 days.

(21) Appl. No.: 16/849,825

(22) Filed: Apr. 15, 2020

(65) Prior Publication Data

US 2020/0328885 A1 Oct. 15, 2020

Related U.S. Application Data

(60) Provisional application No. 62/834,259, filed on Apr. 15, 2019, provisional application No. 62/964,017, filed on Jan. 21, 2020.

(51) Int. Cl.
| | |
|---|---|
| *H04L 29/06* | (2006.01) |
| *H04L 9/08* | (2006.01) |
| *G06F 21/57* | (2013.01) |
| *H04L 9/32* | (2006.01) |

(52) U.S. Cl.
CPC .......... *H04L 9/0841* (2013.01); *G06F 21/575* (2013.01); *H04L 9/3271* (2013.01); *H04L 9/3297* (2013.01)

(58) Field of Classification Search
CPC ... H04L 9/0841; H04L 9/3297; H04L 9/3271; H04L 9/3066; H04L 2209/38; H04L 9/3239; G06F 21/575; G06F 21/6218; G06F 21/604
See application file for complete search history.

(56) References Cited

U.S. PATENT DOCUMENTS

| | | | | |
|---|---|---|---|---|
| 8,045,486 | B2 * | 10/2011 | Swan | H04L 41/12 709/224 |
| 8,739,255 | B2 * | 5/2014 | Johnson | H04L 63/101 726/5 |
| 9,191,201 | B1 * | 11/2015 | Thangavelu | H04L 9/0816 |
| 9,325,676 | B2 * | 4/2016 | Tola, Jr. | H04L 67/566 |
| 9,348,927 | B2 * | 5/2016 | Tola, Jr. | H04L 41/12 |
| 10,116,443 | B1 * | 10/2018 | Kalach | H04L 9/0841 |
| 10,355,942 | B1 * | 7/2019 | Mehta | H04L 63/102 |
| 10,778,659 | B2 * | 9/2020 | Tola | H04L 43/08 |

(Continued)

FOREIGN PATENT DOCUMENTS

| | | | | |
|---|---|---|---|---|
| WO | WO-2018124852 | A1 * | 7/2018 | H04W 4/80 |
| WO | WO-2018132872 | A1 * | 7/2018 | G06F 21/6218 |
| WO | WO-2019226115 | A1 * | 11/2019 | H04L 63/0823 |

*Primary Examiner* — Jeremy S Duffield
*Assistant Examiner* — Hassan A Hussein
(74) *Attorney, Agent, or Firm* — FisherBroyles LLP; Ian R. Walsworth

(57) ABSTRACT

A system and method for communicating over a network, including encrypting and decrypting communications of data over the network for providing enhanced security utilizing a blockchain-encryption process and a global device ledger, and further including systems for device and session initialization, automation, data capture, security, providing alerts, personalization of settings, and other objectives. Methods of establishing and monitoring network communications are further included.

10 Claims, 22 Drawing Sheets

(56) References Cited

U.S. PATENT DOCUMENTS

| | | | |
|---|---|---|---|
| 2006/0041761 A1* | 2/2006 | Neumann | H04L 63/083 713/189 |
| 2006/0074618 A1* | 4/2006 | Miller | G06F 11/3664 703/13 |
| 2006/0282900 A1* | 12/2006 | Johnson | G06F 21/604 726/26 |
| 2009/0113538 A1* | 4/2009 | Eom | G06F 21/629 726/12 |
| 2009/0199274 A1* | 8/2009 | Frazier | H04L 63/08 726/4 |
| 2009/0235330 A1* | 9/2009 | Byun | G06Q 30/06 726/4 |
| 2010/0274848 A1* | 10/2010 | Altmaier | H04L 67/14 709/228 |
| 2012/0011360 A1* | 1/2012 | Engels | H04L 9/083 380/278 |
| 2012/0036370 A1* | 2/2012 | Lim | G06F 21/602 713/189 |
| 2012/0204224 A1* | 8/2012 | Wang | H04L 67/63 726/3 |
| 2014/0181892 A1* | 6/2014 | Von Bokern | H04L 63/0876 726/1 |
| 2016/0094543 A1* | 3/2016 | Innes | H04L 9/3263 726/6 |
| 2016/0241526 A1* | 8/2016 | Tola, Jr. | H04L 43/08 |
| 2016/0306966 A1* | 10/2016 | Srivastava | H04L 9/30 |
| 2016/0337484 A1* | 11/2016 | Tola | H04L 63/08 |
| 2016/0350165 A1* | 12/2016 | LeMond | G06F 11/0787 |
| 2016/0366102 A1* | 12/2016 | Smith | H04L 9/0841 |
| 2017/0083643 A1* | 3/2017 | Seigel | G06F 9/45558 |
| 2017/0193191 A1* | 7/2017 | Blum | G16H 20/13 |
| 2017/0346848 A1* | 11/2017 | Smith | H04W 12/069 |
| 2017/0353979 A1* | 12/2017 | Lee | H04W 12/03 |
| 2018/0007059 A1* | 1/2018 | Innes | H04L 63/0853 |
| 2018/0047226 A1* | 2/2018 | Zhao | G07C 9/28 |
| 2018/0062849 A1* | 3/2018 | Pope | H04L 63/126 |
| 2018/0191708 A1* | 7/2018 | Saha | G06F 21/31 |
| 2018/0212779 A1* | 7/2018 | Bergmann | H04L 9/0869 |
| 2018/0343238 A1* | 11/2018 | Tola | H04L 63/0421 |
| 2018/0357294 A1* | 12/2018 | Zhang | G06F 21/64 |
| 2018/0375841 A1* | 12/2018 | Tola | H04L 9/3239 |
| 2019/0028185 A1* | 1/2019 | Tomasicchio | H04B 7/18504 |
| 2019/0121989 A1* | 4/2019 | Mousseau | G06F 21/6218 |
| 2019/0190889 A1* | 6/2019 | Chanda | H04L 63/0272 |
| 2019/0238525 A1* | 8/2019 | Padmanabhan | H04L 63/0428 |
| 2019/0253434 A1* | 8/2019 | Biyani | H04L 63/126 |
| 2019/0281046 A1* | 9/2019 | Xu | G06F 16/24552 |
| 2019/0306166 A1* | 10/2019 | Konda | H04L 63/0876 |
| 2020/0004978 A1* | 1/2020 | Albano | H04L 63/101 |
| 2020/0233907 A1* | 7/2020 | John | G06F 16/901 |
| 2020/0328885 A1* | 10/2020 | Tola | H04L 9/3066 |

\* cited by examiner

Local System

Session Communications

- LDC First
  - Each device establishes LDC connection first

- Kerberos-Based
  - Peer-based device communication requires ticket from LDC

- LDC Maintains Ledger
  - Each transaction is recorded in LDC Domain Database
  - LDC can change Device Ticket any time

Distributed Blockchain

- Device A sends transmission to device B

- Device A sends communication log to LDC

- Device B receives Device A transmission

- Device B sends communication log to LDC

Session Encryption

Device Agent Packet Processing

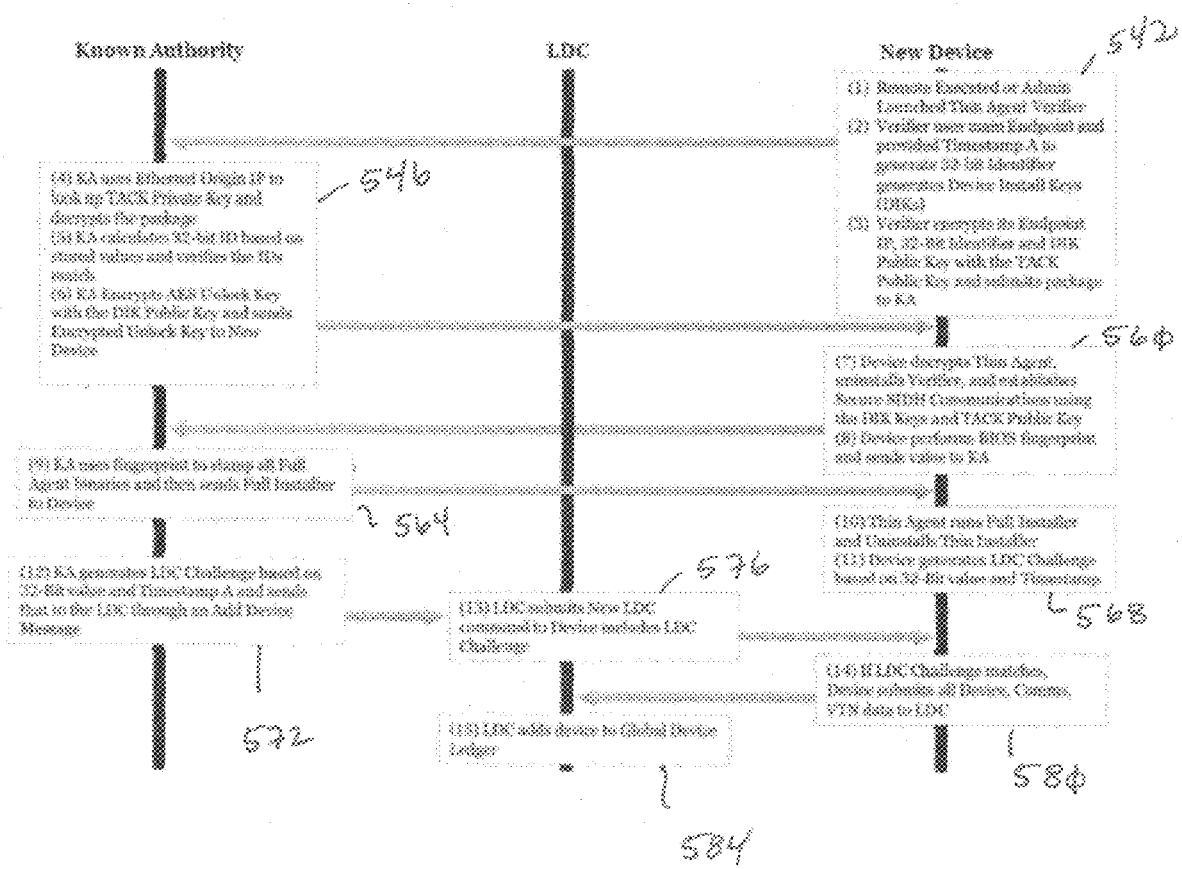

Peer-Based Device Communications Initiation

Policy Enforcement: Bidirectional Communications
Everything Normal

Device Initiation: Normal

Policy Enforcement: Bidirectional Communications
Majority Matches But Not Local

Policy Enforcement: Bidirectional Communications
Most Match Local But One Is Wrong Policy Enforcement: Unidirectional Communications
Bad Hash Detected Communications Control List Generation Changing LDCs

ENHANCED MONITORING AND PROTECTION OF ENTERPRISE DATA

CROSS-REFERENCE TO RELATED APPLICATIONS

This application claims priority, pursuant to 35 U.S.C. § 119(e), to U.S. Provisional Patent Application Ser. No. 62/834,259, filed on Apr. 15, 2019, and to U.S. Provisional Patent Application Ser. No. 62/964,017 filed on Jan. 21, 2020. Both of these applications are incorporated herein in their entireties.

FIELD OF INVENTION

The present application relates to systems and methods for protecting enterprise data and applications and network communications for enterprise data and application. The present application also relates to the use of artificial intelligence and machine learning to enhance these systems and methods.

BACKGROUND

Modern networks are rapidly increasingly in scale, complexity and vulnerabilities. Operators are concerned with locking down endpoints and their communications at the lowest levels of each device to more effectively close these security gaps. At the same time, cybersecurity has to be disconnected from platform complexity in order to unify protection and decrease operational loads.

Enterprises frequently collect data from consumers and other users of enterprise communication systems, including data obtained from Internet-enabled communications. This data includes personal data and is at risk of loss and potential exploitation. As a result of recent breaches of enterprise data protection schemes, consumers have low confidence in sharing data with various enterprises. In turn, the enterprises impacted by the breach or risk of breach have incurred great expense in an attempt to address these concerns.

Various countries, corporations and Internet Service Providers block, censor or filter communications transmitted between two or more nodes. These communications can occur via the Internet, an Extranet, an Intranet or any other communication path that allows two nodes to communicate with one another. The mode of communication between the nodes is independent of the communication path and includes, for example, client/server, peer-to-peer and mainframe communication architectures. All types of communications, including, for example, wireless, cellular, wired, optical and satellite communications may be subject to filtering.

Almost all security products on the market today follow the same exact pattern for detecting threats. Each product obtains historical threat metadata—and even the most current threat sources are days, weeks, or months old—and then attempts to find the historical threat signatures in current operations. In most of these cases, threat metadata is heavily restricted to one of the three pillars of device behavior—Communications; Operations (e.g. motherboard and/or operating system kernel activity); and Hardware Operations. Some products pull in limited combinations of descriptors—such as OS errors, plus some level of communications, however any product not placed directly on a device, merely monitors the network's Communications.

For most of these products, these static sets of metadata are then compared to a centrally aggregated collection of data from every device in an enterprise. At this level, there is an incredible amount of noise—the term for normal device behavior. Of current products using machine learning to attempt to overcome noise issues, many of them only achieve very limited effective detection rates and suffer from a high rate of false alerts.

A modern cyber-attack tactic involves reusing existing threat components in novel combinations. A threat simply changing a URL, or the order of an intrusion, often suffices to overcome most security products.

As technology continues to advance, Machine Learning and/or Artificial Intelligence (AI) has grown in importance for complex operations. Within Cybersecurity, however, AI is, at best, a "bolt-on" solution with limited scope and ability to interact systemically. In modern cybersecurity solutions that leverage any AI, such as Security Incident and Event Management (SIEM) systems, any machine learning algorithms are applied with the intent of filter out anomalies through a sea of noise.

True End-to-End AI functionality requires a completely integrated series of machine-learning processes, options such as neural networks and random forests and the ability to make changes to a system, measure the result and then adjust those modifications.

Noise is the result of collecting non-normalized information from a large number of devices—each with their own operating systems, hardware operations and communication logs. As the number of devices grows, the amount of noise—or data that contains normal, but undefined, functionality, grows exponentially. In many modern systems, even a few thousand devices result in a relative inability to find anomalies through this noise as supported by very low detection rates and high false positive errors.

As the complexity of manufacturing more sophisticated devices; such as smart devices, appliances, cars, and so forth; grows, device providers increasingly rely on component manufacturers to support the burden of creating parts for their overall smart devices. These smart devices can range, but are not limited to, smart appliances, automation devices for the home, office, production, robotics and so forth. Over time, certain component manufacturers have obtained special certifications denoting the security of their components. While the actual components are generally the same in terms of quality across certified and non-certified component manufacturers, certified manufacturers often charge significantly more for their components.

Device providers, despite a strong desire to lower component prices, are typically forced to purchase the higher-price options for a number of reasons from business obligations to regulations to other concerns. Over time, these certified components have not proven to be any more effective at protecting smart devices from any form of cybersecurity issue. Device providers are therefore caught in a disadvantageous scenario wherein they are purchasing higher-priced, certified, components and still not providing any more secure devices.

Furthermore, with uncontrolled access to the external world, hidden, malicious code placed in hardware components can (1) be triggered remotely, (2) send unauthorized data and, in most other manners, (3) be utilized in a harmful manner regardless of the primary functionality provided by a given hardware component.

Unlike old traditional networks, modern networks often require very long running sessions. Traditional security approaches were designed for short duration protection and, as such, are readily overcome in long-running communication environments. In IoT and 5G communications, for example, lack of data security as data flows between users, devices, and supporting networks present problems when protecting users, user devices, networks, and enterprises. The primary issues often relate to communication security and integrity, particularly as additional devices are added to the network and modifications are made to the system. In addition to protection of data, communications security also refers to a wide range of applications including communications control, session initiation, and network monitoring. In addition to communications between endpoints, or data in transit protection, securing the endpoints themselves, such that the sender and receiver in a given communication are validated, is critical to overall protection.

Numerous prior solutions have attempted to improve upon network communications, device, and data security. However, despite these attempts, deficiencies still persist. These prior solutions generally relate to point-to-point communications protection, communication management, and network defense.

SUMMARY

Embodiments of the current invention address these challenges by improving and enhancing network communications using a novel blockchain encrypted schema, and by anticipating unreliable components at the level of a endpoint and local system. These component constructs may entail several components in a configuration wherein a virtual communications kernel is implemented outside of a BIOS. In these instances, hardware components are able to communicate with one another, but they are not able to directly communicate with the outside world unless authorized by, for example, a virtual communications kernel. In these embodiments, device providers can ascribe rules to each hardware component that severely restricts external communications accordingly to the methods described previously.

Each of the following patents and patent applications are incorporated herein by reference in their entireties for all purposes: U.S. patent application Ser. No. 15/992,634, filed on May 30, 2018; U.S. patent application Ser. No. 15/115,209, filed on Jul. 28, 2016; U.S. patent application Ser. No. 15/136,641 filed Apr. 22, 2016, now U.S. Pat. No. 9,992,180 issued Jun. 5, 2018; and U.S. patent application Ser. No. 13/480,057 filed May 24, 2012, now U.S. Pat. No. 9,325,676 issued Apr. 26, 2016.

Applicant has architected a new type of cybersecurity platform that can be deployed, managed and remediated with no unwanted operational disruptions. This ability to continuously change without causing issues to systems and users has enabled Applicant to build the first true End-to-End machine learning ("ML")/Artificial Intelligence ("AI") system in cybersecurity. The distributed ML components drive powerful automation in a disconnected local environment and add even more resources when asynchronous processing is enabled.

While a considerable portion of this disclosure focuses on the detection, isolation and remediation of abnormal cyber threats, the Applicant's system is capable of handling additional operations. For example: dual use laptops or phones for secure transmission centers on demand or virtually-isolated personal and secure profiles; abstracted secure communications that shield the complexity of network routing from operating systems and devices; and distributed efficiency management that scales from the point of a single device through an entire smart grid, to name a few.

Applicant leverages the locally generated device behavioral profiles to produce a new approach to network virtualization and its Live Labs operations. Live Labs aids in: observing threat behaviors over time; determining clean device profiles in a multitude of local environments; and in predicting systemic cyberattacks leveraging AI.

Applicant has created a construct which is termed a Virtual Private Enterprise (VPE). In embodiments, the VPE connects virtual and physical systems into a single virtual network. A VPE can run over any existing network, regardless of communication type, while locking down devices throughout their lifecycle. The VPE can provide better-than-private cloud protection in a public cloud infrastructure, for example, while unifying and visualizing the management of devices and communications at scale.

In embodiments, Applicant's system leverages Supersingular Isogeny Diffie-Hellman (SIDH) key exchange and key encapsulation methods, providing enhanced security with respect to exchange of public and private key pairs between devices or from a device to a Known Authority, for example. The exchange of key pairs may occur in any order, or simultaneously, and avoid detection through known exploitation techniques, such as using static keys to obtain the value of a secret key and thereby obviating the protocol.

Applicant also provides a distributed End-to-End AI system in cybersecurity. This system enables powerful automation capabilities that leverage the highly adaptive nature of Applicant's cybersecurity platform.

Applicant has also enabled a War Games service, which uses virtualized simulations that mirror target systems in order to run through various "use cases" that emulate real life. With this service, other cybersecurity tools can be functionally certified in an ongoing basis to ensure that the advertised protection is working and determining issues before they turn into exploits.

Certain terms are used throughout the following description and claims to refer to particular system components. As one skilled in the art will appreciate, companies may refer to a component by different names. This document does not intend to distinguish between components that differ in name but not function.

In the following disclosure, the terms "including" and "comprising" are used in an open-ended fashion, and thus should be interpreted to mean "including, but not limited to . . . " Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections. Connections can occur in a unidirectional, bidirectional or variable directional manner over all known means of network connectivity.

As used herein, the term "user" refers to a uniquely identifiable construct within a system that is able to perform an action within the system. This action is not limited in scope and can include such things as create, read, update, delete (CRUD) options, transport, transformation, communications and so forth. For example, a "user" is not limited to a human being, but also includes processes, services, and other such subsystems and code that can be assigned unique identifiers. Thus, a user differs from a unique option such as a row identifier in a database table, which is unable to take any action on the system. In some instances, a user refers to a logical construct such as a user of a virtual machine running within the context of a physical device. In this instance, the virtual user is a version of the user mapping of the application hosting the virtual machine.

As used herein, the general term "device" refers to either a physical device (or group of physical devices) or a virtual machine or device. A physical device generally refers to the physical and software resources required to run an operating system and supporting software. A virtual machine generally refers to an emulation of a computer system, which may be carried out by a physical device or a collection of physical devices acting towards one logical purpose. Grid computing and clustered servers are examples of multiple devices working towards one logical purpose.

As used herein, the terms "user device" and "active user device" refer to the logical intersection of a device and a user. Users and devices may have a many-to-many relationship and thus multiple user devices may exist within a given device or for a given user at any one time.

As used herein, the terms "Internet of Things" and "IoT" generally refer to a system of devices capable of communicating over a network, including the communications of data over the network. An "IoT device" may include everyday objects such as thermostat systems, door locks, faucets, washers, dryers, lamps, kitchen appliances, automobiles, as well as enterprise devices such as printers, routers, mobile phones and any other device able to connect to any type of network.

As used herein, the term "platform" refers to a grouping of similar devices. Devices may be grouped based on the type of operating system used, the type of device itself (e.g., secured/unsecure; desktop/laptop/mobile; client/server; peer/super peer; or old/new), or another distinction that identifies devices in a given system either by its presence and variability among devices or by it lack of presence in some subset of devices. Thus, as used herein, the term "cross-platform" as in "cross-platform communication" refers to devices of two different platforms that communicate with one another; such a cross-platform system may be referred to as a hybrid system.

Finally, as used herein, the term "operation" or "performing an operation" refers to a packet-modifying operation such as encrypting the packet, replacing the packet with an alternate packet, deleting the packet, cloning the packet, replacing the packet with a packet pointer, and the like. Performing an operation on a packet may be restricted to a base datagram and may exclude to the modification of header fields.

BRIEF DESCRIPTION OF THE DRAWINGS

In the drawings:

FIG. 8D illustrates a workflow process for adding a new device to the system according to embodiments of the present disclosure;

DETAILED DESCRIPTION

Figure 1:
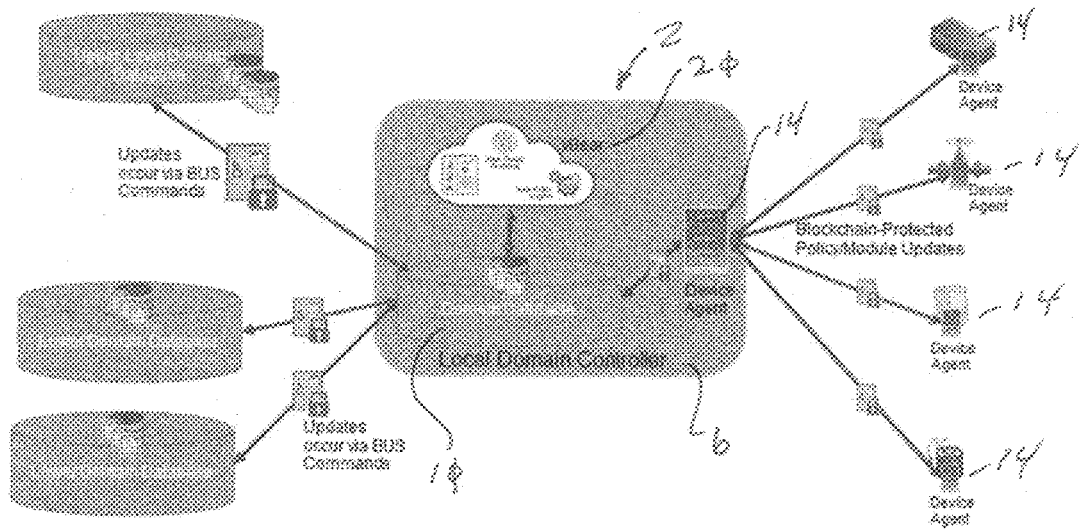
FIG. 1 illustrates aspects of a system according to embodiments of the present disclosure.

The following disclosure is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the disclosure of any embodiment is meant only to be exemplary of that embodiment, and not intended to intimate that the scope of the disclosure, including the claims, is limited to that embodiment.

Applicant's system preferably starts by placing a small software agent on every device and may be comprised of any combination of internal/external Operating System (OS) software as well as circuit board/hardware component features depending on the embodiment. Those agents, which work across embedded and non-embedded OS systems, are then connected to a an application that works in a device-agnostic manner to control the protection, communications and operations of each device. Other embodiments might leverage a thin agent during a largescale deployment in order to load a default installer on each device. In certain embodiments, this thin agent can then request a full agent from a Local Domain Controller or LDC; a Known Authority (KA); and/or a Main Domain Controller (MDC); or a different defined deployment location. Using this approach optimizes secure deployment options, enables any localization customization and can increase overall flexibility by offloading the main work in a distributed manner.

During start up and provisioning stages of a new system, the thin device agent may also complete a number of other functions, including creating a unique device key pair for each device. The thin agent preferably creates a device ID and a hash of the device ID, which are then stored in, for example, a trust zone. The device ID may comprise specific steps or processes in the particular device ID string, which may be encrypted using the unique device key described above.

According to embodiments, the system can authenticate a device by obtaining a device key, decrypting a device ID string, recreating the device ID, then matching the values of the device ID stored in the trusted zone (which itself may be encrypted/decrypted) to ensure integrity among devices. Any failure during this process may cause a workflow error process to be initiated.

In certain embodiments, the generation of the device ID is a critical foundational element upon which many other operations rely. By continuously self-authenticating the device ID, a local device agent knows the device upon which it operates, and this feature significantly reduces authentication processes. To this end, the device ID is a dynamic process that, in these embodiments, can be modified at any time to provide additional layers of protection. Some embodiments might utilize, but are not limited to, accessible provisioning, manufacturing, hardware and even application registry identifiers.

In embodiments, the system comprises a device policy for securing generating the device ID in a repeatable manner. The device policy can optionally include numerous options, algorithms, and random data generators to aid in the identification process. Thus, the device policy might contain a list of possible hardware components along with paths for obtaining identifiers associated with each component. By paths, this disclosure is intended to refer both to physical paths as well as dynamic data or function calls to make local BIOS connection. Alternatively, a policy might contain algorithms and steps to perform a device fingerprint, including such options as inspecting the BIOS and/or exercising any hardware components such as the processor or memory cards, to develop an identifier for a given device. At times these identifiers will be universally unique, where, in other embodiments, the uniqueness might be reliant on external attributes such as, but not limited to, device location, organization options, for example, office name, network, or enterprise.

The device policy may also determine the minimum/maximum number of hardware from which information will be collected. For example, during initialization, the device policy may randomly select and assign hardware IDs within the maximum range. The position of the selected hardware component(s) is stored within the hardware ID string. In this manner, the device policy established a unique ID for each component device in a local system.

Referring now to FIG. 1, a system for protecting devices connected to one or more local systems is depicted. In this diagram, a Local System 2 comprises a Local Domain Server ("LDC") 6. The LDC 6 may be comprised of one or more databases, such as a domain database 10, a device agent 14, and any management platform, portal, or console sufficient to enable data interactions.

A Local System 2 can be defined as any devices locally connected to an LDC 6 or through any processes, scoping tools or other organizational options to group together devices based on any levels of connectivity, attributes, or any other discerning features amongst devices.

In some embodiments, the LDC 6 may be further defined into distinct variants in order to aid in management and deployment. For example, in some embodiments, there may be a Main Domain Controller (MDC) that might reside logically at the top of a hierarchy of LDC deployments. This MDC may include additional options such as a Licensing Server that may, itself, by used to control LDC and/or device agent installations.

Further embodiments may include Known Authorities (KA) either in the previously described embodiment or in addition to the MDC. While a KA might be for organizing purposes only, some embodiments may include special rules and options such that all deployments to a given device require a KA and/or all blockchain protected transmissions targeting a device flow only through KAs, or between the MDC and KAs, on their way to a given device. In these latter embodiments, the actual information might flow through intermediate LDC endpoints but not be decrypted in those LDC devices.

To this end, as one example, an MDC might send a blockchain encrypted package to a KA and that KA then decrypts the package. Depending on some embodiments, the KA will decrypt all parts of the package and then, optionally, re-package the data for each new KA and or device target. In other embodiments, the KA might only be able to decrypt the main package, any optional parts targeting the KA device, but no individual device packages. In these latter embodiments, the KA might optionally re-package those parts for other KAs and/or device endpoints and transmit those to the appropriate target.

The system in embodiments may also comprise a vBear module 20, which is a visually-oriented management platform, which runs as a local use agent system. The vBear module may be configured to connect locally to a datastore associated with the system, such as an encrypted datastore. In operation, the vBear module runs its own set of policies to register communication threads with at least one device agent. This process protects local devices and restricts user access based on a LDAP Integration module. The LDAP Integration module preferably operates as follows: the MDC begins with a username/password combination for each type of device access permitted with the MDC. For example, if a device type does not match the deployment target, no access is provided to the MDC and any policies stored therein. Thus, the LDAP Integration module supplies a single login to connect to a LDAP system, and only assigns additional users a login at a LDC-specific level, organizational level, or other administrator-defined criteria. In turn, the system will defer user authentication to the LDAP system, which means additional device-level authentication is only ever supplied at the device-level to ensure the proper access is achieved consistent with the LDAP Integration module.

In embodiments, the vBear module operates from known data in the local datastore, which in turn only contains information at the level of the LDC (and below the LDC), thereby limiting exposure to non-critical data.

As each device agent establishes secure communication with the LDC, and as the LDC has the ability to send updates to all devices associated with the local system, only authorized peer device communications are allowed. Further illustration of these principles is provided in the following paragraphs.

In embodiments, the device agent(s) facilitates communications with devices in the local system. Preferably, each device in a local system is configured with at least one device agent that is invisible to other systems and applications. In one embodiment, the device agent is installed as a driver or otherwise as a no-UI application. This allows the device agent to acquire and process packets outside of an operating system, and preferably in a low-level application.

The acquisition of packets may be achieved through a "shim" (i.e., NDIS for Windows-based applications or IP Tables for a Linux-based application) configured to grab packets before they exit or as they enter the kernel described in conjunction with FIG. 5 below. The device agent also preferably comprises an internal self-check protocol to ensure that a device key or device ID is valid, or to ensure that the latest version of any policies/modules maintained by the LDC are enforced for all peer-based communications.

While each device agent is configured to immediately establish a secure connection with the associated LDC, the domain database of the LDC may also communicate and send updates (for example, via BUS commands) to other domain databases located outside the LDC, as shown in FIG. 1. The LDC may be installed on either a new device or an existing device. In a preferred embodiment, the LDC facilitates out-of-band communications by way of a filter, which is specially configured to filter application traffic and undesired packets from the LDC. The filter in one embodiment is configured to apply only to specific packet characteristics, such as TCP/IP header value, source IP, port, etc.

In another embodiment, the LDC is configured to inject a unique identifier into each packet payload, thereby creating a virtual band for communications routed by the LDC. The LDC may be coupled to a visual device manager, which may further comprise one or more engines, such as a policy engine or threat analytics engine as shown in FIG. 1. Additional engines and/or modules may be provided with the LDC, including those described in detail below.

The system 2 of FIG. 1 may be configured to operate in connection with an event bus or equivalent bus-based command and control system. In embodiments, the event bus is configured to send and receive data between local systems, or alternatively between known devices in a local system. In embodiments, an event manager distributes messages (command and control) to separately update the LDC database. Alternatively, the event manager may communicate directly with a specific device or a device agent. The event bus topology enables the event manager to receive and distribute messages (binary or text). Simultaneously or near-simultaneously, the vBear module records the transmission of messages and any errors that are received by the event manager. Messages that are sent are preferably encrypted, as described in greater detail below.

During communications with any devices on the local system, each device may establish a connection with the LDC, in the first instance, via the device agent. These are referred to as "LDC First" communications. Alternatively, or in addition to LDC First, peer-to-peer device communication may occur by each device obtaining a "ticket" from the LDC, and each transaction is recorded in the domain database. This serves as a transaction ledger within the LDC, which in turn allows the LDC to modify a device ticket at any time. Illustration of this communication is shown in FIG. 2.

Figure 2:
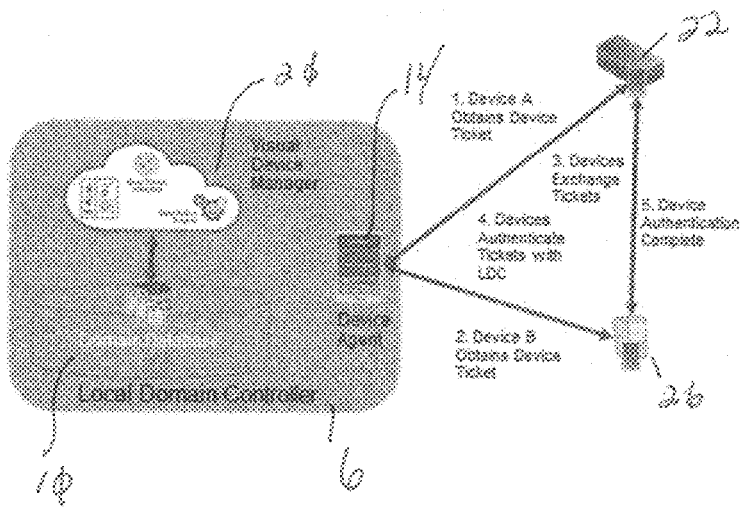
FIG. 2 illustrates aspects of system communications according to embodiments of the present disclosure.

As shown in FIG. 2, a first device 22 may obtain a device ticket from the device agent 14. Simultaneously or sequentially, a second device 26 may obtain a separate device ticket from the device agent 14. According to one embodiment, the first and second devices may exchange the device tickets obtained from the device agent, and may further authenticate the device tickets exchanged with the LDC 6. In this manner, both the first and second device communication paths may be verified by the device agent, and further data security policies may be applied, such as the security policies described below.

The communications routed through the LDC are preferably all encrypted using a specially configured blockchain-based encryption protocol. In embodiments, the device agent(s) of the LDC handles decryption of encrypted communications routed to the LDC, while the vBear module handles encryption (or reencryption) of communications routed from the LDC. In embodiments, each LDC contains an initial value for each device associated with the LDC, which is referred to herein as Blockchain A. Each device, in turn, contains this same value. Furthermore, each time an update is sent to the LDC, the vBear module requests a new UUID from its associated local database for that particular update.

In practice, the database preferably solicits the target device information, update type and a timestamp. The database then returns Blockchain A, as well as a new Blockchain B. The returned value is thereby inserted into the update (as Blockchain B) with the update type. In one embodiment, the returned value is inserted as metadata. Blockchain A is preferable a 32-bit UUID used as a "key" for encryption. In certain embodiments, the encryption is performed using a gzip (gz) filename or equivalent. After Blockchain B is returned, Blockchain A is then applied and the encrypted file is sent to the target device. The target device in turn uses Blockchain A to decrypt the update and obtain Blockchain B from the database. Finally, Blockchain B replaces Blockchain A as the new value for the update occurring on the system.

Figure 3:
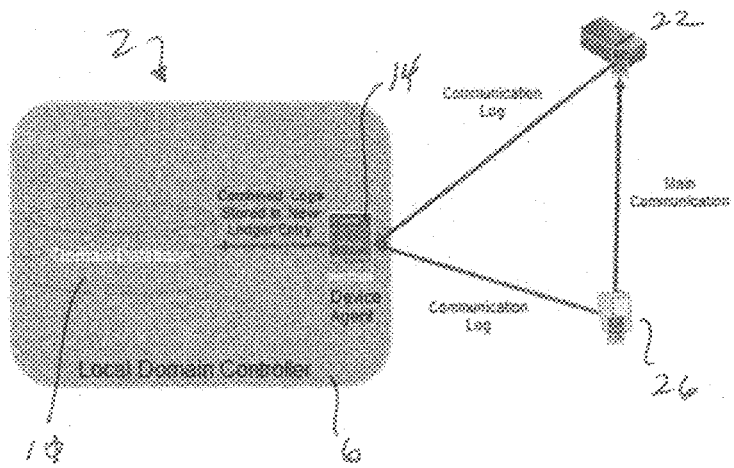
FIG. 3 illustrates further aspects of system communications according to embodiments of the present disclosure.

This process of encryption and decryption is further illustrated in FIG. 3. Here, the LDC 6 comprises a domain database 10 and at least one device agent 14. The local system 2 also comprises at least a device A 22 and a device B 26. Device A may send a transmission to device B as a main communication message, which triggers device A to send a communication log entry to the LDC. Once device B receives the transmission from device A, device B also sends a communication log to the LDC. The combined logs are the stored in a new ledger entry in the database. FIG. 3 illustrates how the blockchain encryption/decryption can thereby become more distributed among the devices associated with the local system and LDC.

In one embodiment, the device agent implements one or more policies to direct workflow and prevent errors within the local system. The device agent policies are preferably applied throughout the entire local system and may be updated or modified periodically. In addition, each module may comprise policies that are different from the device agent policies. Policies may include device policies, which may dictate internal configuration for each device in the local system.

Device policies are preferably limited to a single policy per device, and may further comprise a communications control list (CCL). Policies may also include session policies, which are configured to protect longer running session protocols and communications. As opposed to device policies, session policies may have multiple policies per device.

In embodiments, the CCL organizes communications by device type or by each unique device within a local system. The CCL further contains the types of communications allowed (i.e., WiFi, Bluetooth, Ethernet, OTA and others). The CCL also preferably comprises initiation rules for each device, and may further dictate the specific encryption algorithm to apply in communications received or sent by a device. The CCL is also configured to identify or provide the specific filters (described above) to apply, including by way of example but not limitation, the total amount of data allowed, the types or formats of data packets transmitted, timing, throughput, and other packet-level filters. In a preferred embodiment, the LDC maintains the registry of devices within the local system and may send updates to the CCL when a device is added or modified to maintain integrity. For example, the LDC registry contains the device public keys, device URIs and device types, which may be periodically provided to the CCL or as events occur (such as a change to a device).

Figure 4:
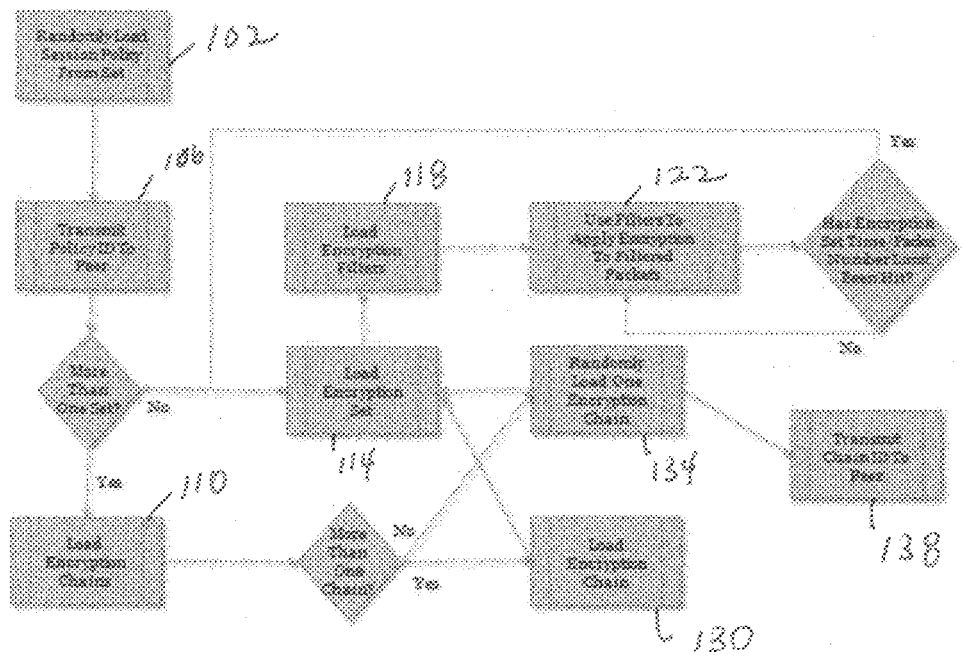
FIG. 4 depicts a flow chart diagram for an encryption process according to embodiments of the present disclosure.

Referring now to FIG. 4, a flow chart diagram is provided for demonstrating how encryption is applied during a particular session. In this exemplary embodiment, at least one session policy is loaded 102 and transmitted with the policy ID to each peer 106 communicating during the session. If there is more than one set, then encryption chains are loaded 110, and if not an encryption set is loaded 114. If only one set, after the encryption set is loaded, encryption filters may be loaded 118, if any, and then applied to generate filtered packets 122. This process repeats until all packets have been filtered (i.e., the total number of packets has been reached). Alternatively, this process may repeat for a set time. In the event there is more than one set, the next step is to load the encryption chain 130, and then load the encryption set for that chain 114. If there is more than one encryption chain, the system may randomly load any one encryption chain 134 and associated encryption set, and also transmit the loaded chain and chain ID to the peer 138. This may be repeated for each chain until completed, and may further include the steps of applying filters until all packets have been filtered.

The vBear module, according to a preferred embodiment, comprises a visual user interface for visually displaying devices contained within the associated LDC database(s). This interface preferably facilitates direct interactions with each of the devices contained within the database, although in alternate embodiments the interface is configured to enable interactions only with devices of a certain type. For instance, the interface may apply filters for a user to select the type of device, type of communication, active versus inactive or known versus unknown devices, among other criteria. The interface also enables visualization from a very high level (i.e., at the level of the LDC) as well as all lower domains contained within the local system.

Figure 5:
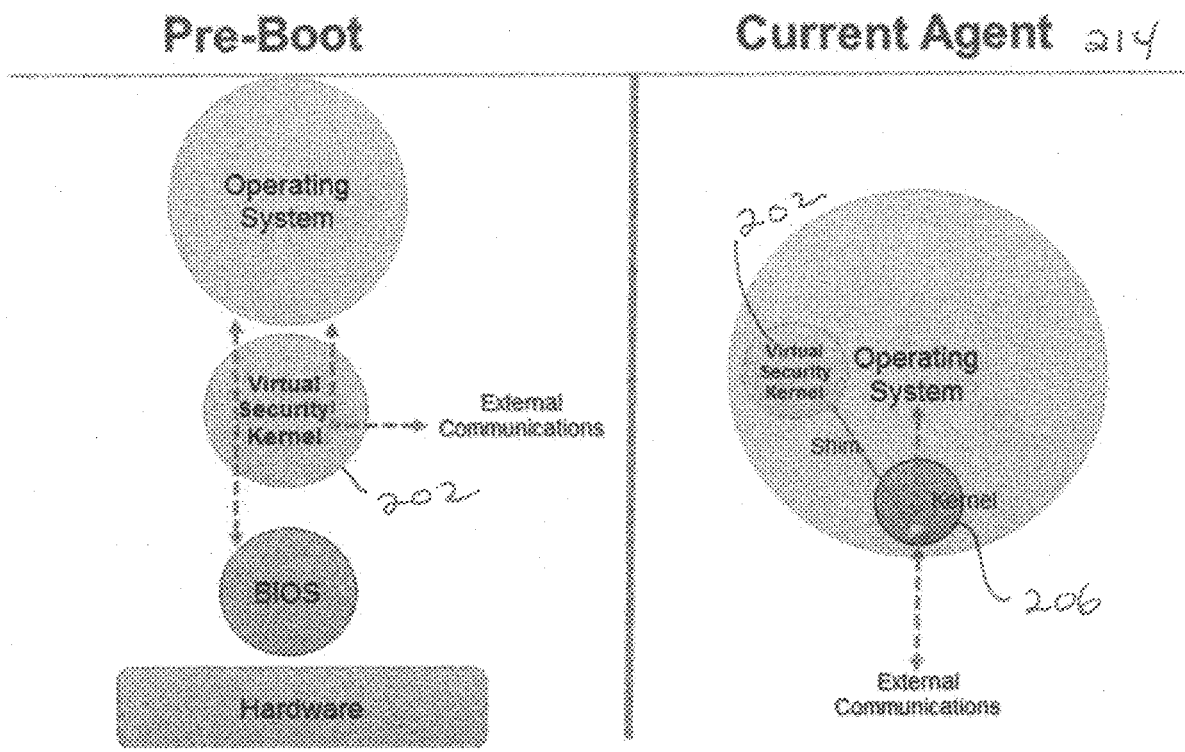
FIG. 5 illustrates aspects of various system components according to embodiments of the present disclosure.

Referring to FIG. 5, the device agent 214 may be configured to comprise a virtual security kernel 202, which in turn provides device identity, authentication and secure communication. The virtual security kernel 202 preferably resides at the kernel layer 206, outside of typical communication protection protocols for facilitating application during pre-boot loading protocols. In embodiments, the virtual security kernel loads immediately after BIOS operations occur. The virtual security kernel preferably performs a self-check diagnostic routine (preferably in a trusted zone) before reverting to normal computing. This permits normal operating system boot operations to run, as shown in FIG. 5, without interruption.

The virtual security kernel may comprise one or more core modules, including an interface manager to interface with a host device or operating system, and to isolate other modules of the virtual security kernel. Other modules may comprise a packet manager comprising the workflow engine (logic) to parse different types of packets and reconstruct those packets as necessary. Modules may also include a "cryption" manager to process encryption sets and/or filter packets requiring encryption. Alternatively or additionally, the "cryption" module may also apply and manage encryption algorithms. The virtual security kernel may also comprise a key manager for creating and assigning encryption keys, and a device manager for coordinating transmission between modules. Finally, an update manager module may be provided for determining trusted versus normal computing transactions and for reading incoming updates from the local system clients or routed to target devices (upstream or downstream).

The virtual security kernel may also comprise one or more data modules, such as an event manager module for applying policies or to translate device events into an appropriate format for processing. Other data modules may include a log manager for capturing all communications and transactions into a unified format, or a health manager for recording and/or reporting processor speed, temperature, power usage, memory, etc. in a standard format. The virtual security kernel may also comprise an analytics manager, which obtains data from the other data modules and processes that data according to one or more rules established by the user. Various remediation modules may also be provided, including a workflow manager to control the processing of workflows across other modules, or an alert manager to communicate alerts, such as failures. Other modules may include a process manager for stopping or redirecting data for a particular process, and a firewall manager for stopping or redirecting data for a particular port.

Figure 6:
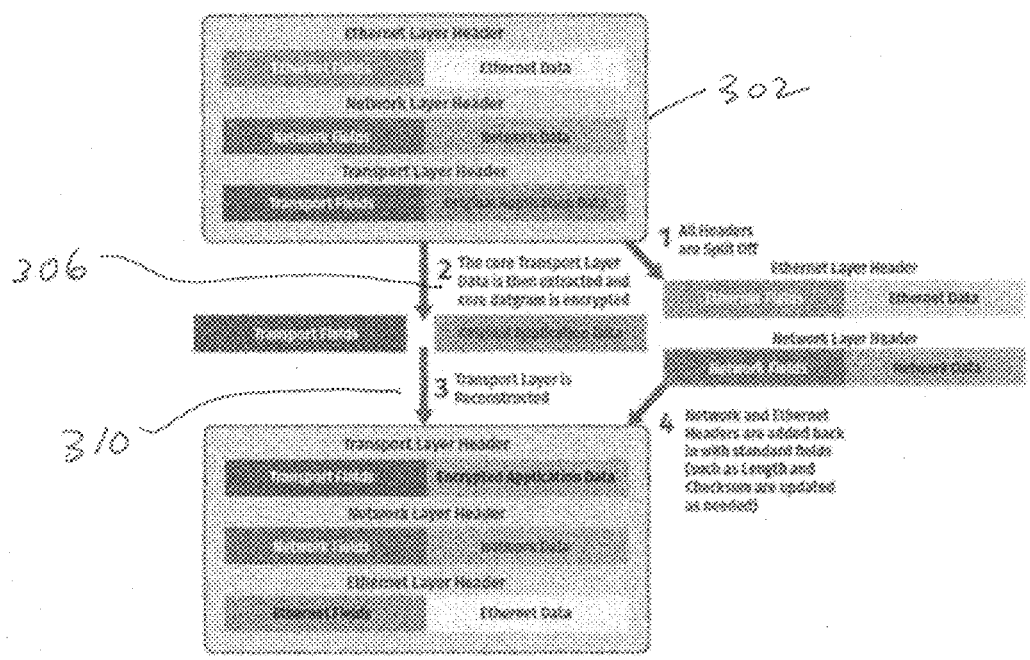
FIG. 6 illustrates various elements of data packets processed by a device agent according to embodiments of the present disclosure.

FIG. 6 depicts the structure of an exemplary data packet, as well as the manner in which a packet may be processed by a device agent, according to one embodiment. As shown in FIG. 6, and according to an exemplary embodiment, the packet headers 302 (Ethernet and other network layer headers) are initially stripped away from the packet. Next, the core transport layer data 306 is extracted. This permits the core datagram to be encrypted, as described in greater detail below. Next, the core transport layer is reconstructed into the packet 310, and the network and Ethernet headers are added back into the packet. At this point, standard fields (such as length and checksum) may be updated as needed.

Figure 7:
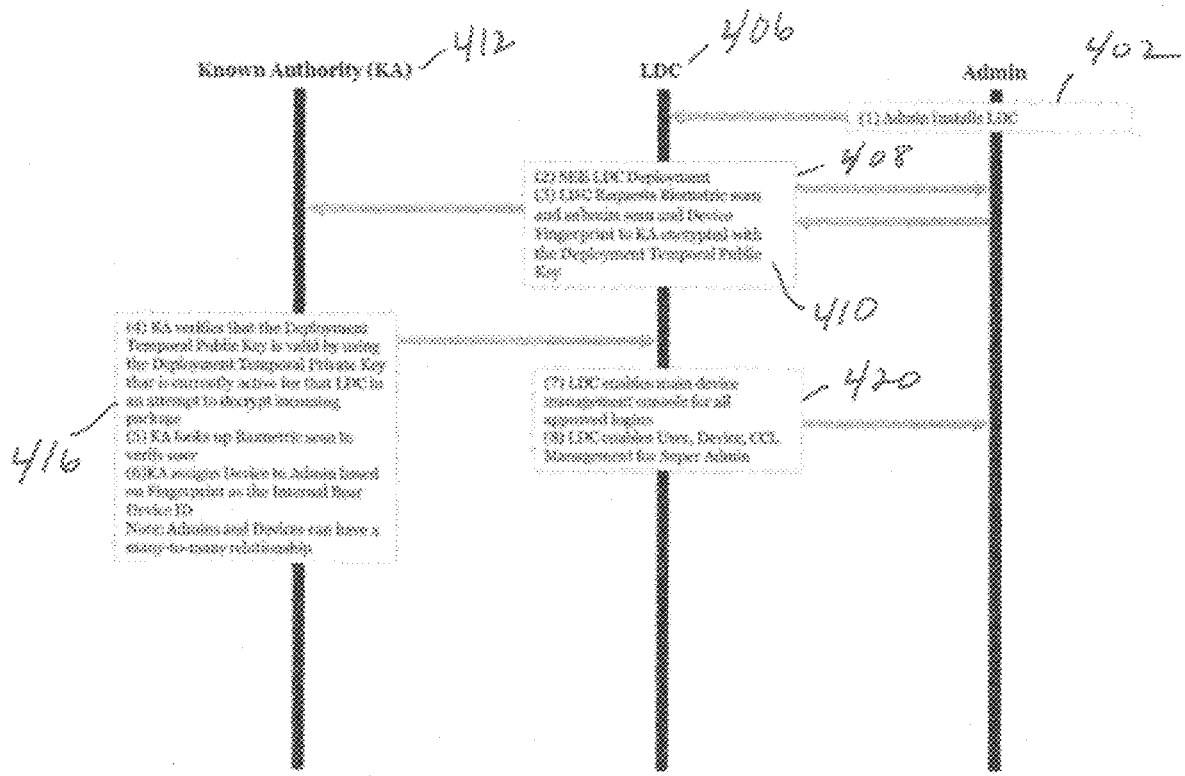
FIG. 7 illustrates a workflow process for establishing system access according to embodiments of the present disclosure.

Referring now to FIGS. 7-20C, a number of workflow or flowchart diagrams are shown to further illustrate certain aspects of the present disclosure. Referring to FIG. 7, a specific workflow associated with establishing access to one or more modules associated with the system is shown, which in a preferred embodiment comprises a number of discrete steps, some of which may be repeated depending on the particular needs of the system. In embodiments, the workflow may be employed to establish access to the vBear module. In one step, the administrator preferably installs one or more local domain controllers (LDCs) 406 and establishes communication with the same. Once this is done, the administrator may further establish an LDC Deployment module 402 (see FIG. 11A) and deploy the LDC (see FIG. 11B) 408. Next, the LDC may requests authentication 410 by communicating with the Known Authority (KA) 412. This LDC request may take the form of a biometric or other scan of a user, whereby the LDC submits the scan results and preferably a Device Fingerprint to the KA. This communication may be encrypted by use of a Deployment Temporal Public Key. Once received, the KA verifies the Deployment Temporal Public Key is valid 416, such as by using the Deployment Temporal Private Key currently activated for the LDC sending the request. Next, the KA looks up the biometric or other scan results to verify the user. Then, the KA assigns the device to the administrator, based on the Device Fingerprint as the Internal Device ID. Next, the LDC enables a main device management console 420 for all unique login IDs approved on the local system, and may further enable user, device, and/or communications control list management rights to a super administrator.

Another workflow (not shown in the appended Figures) relates to new customer acquisition. In this particular workflow, a new customer may submit a new customer request, which preferably is routed through a customer cloud associated with the system and eventually to, for example, a public extranet. In another step, an alert is generated and routed to an administrator, which may result in the creation of a new agreement, depending on the nature of the customer, or may result in a new application for the customer. In another step, a unique login is created for the new customer and access to the system is granted. In another step, the system is provisioned and allowable device types are specified.

A production run may also occur at this time. Each device type may, in turn, cause a "thin" device agent to link to each activated device type, depending on the particular production run in the previous step. In another step, a link to install one or more web services and activation of the thin device agent is sent from the customer cloud to the new customer. Several of the foregoing steps may be repeated based on type and number of new systems/devices provisioned by the new customer.

During start up and provisioning stages of a new system, the thin device agent may also complete a number of other functions, including creating a unique device key pair for each device. The thin agent preferably creates a device ID and a hash of the device ID, which are then stored in, for example, a trusted zone. The device ID may comprise specific steps or processes in the particular device ID string, which may be encrypted using the unique device key described above. According to embodiments, the system can authenticate a device by obtaining a device key, decrypting a device ID string, recreating the device ID, then matching the values of the device ID stored in the trusted zone (which itself may be encrypted/decrypted) to ensure integrity among devices. Any failure during this process may cause a workflow error process to be initiated. Specific error protocols are described in greater detail below in connection.

Figure 8A:
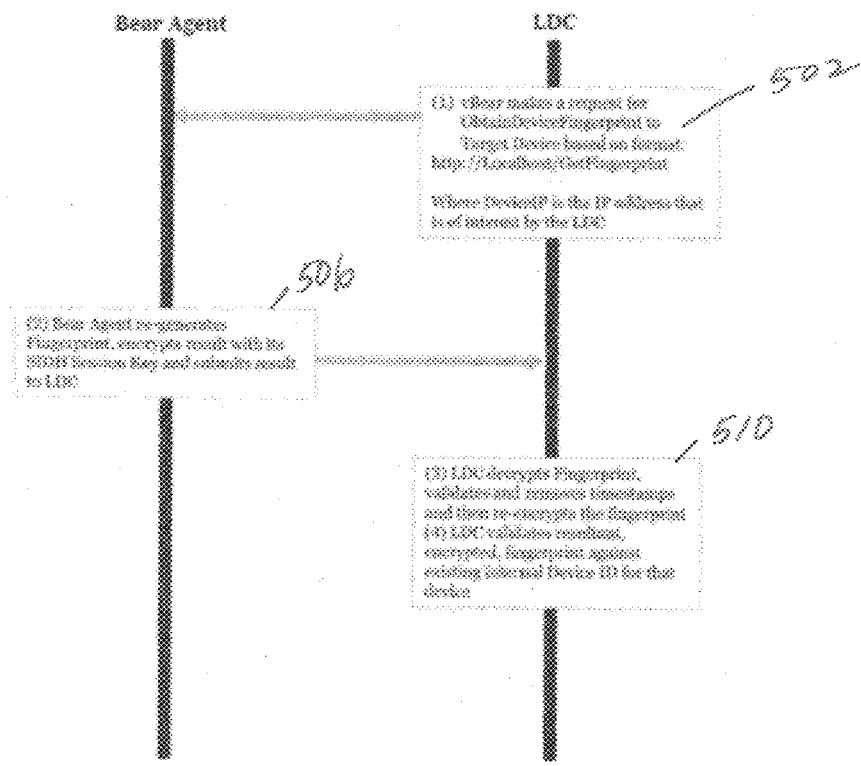
FIG. 8A illustrates a workflow process for obtaining and validating a new device according to embodiments of the present disclosure.

Referring now in detail to FIGS. 8A-E, various other processes and sub-processes are described. Referring in particular to FIG. 8A, a process for obtaining and/or validating a device fingerprint is depicted. Here, the vBear module may issue a request to the target device 502, such as by delivering a ObtainDeviceFingerprint message to the target device. This request may be based on a format such as http://Localhost/GetFingerprint. In this embodiment, "DeviceIP" is the IP address that is of interest by the LDC. The request is communicated to the device agent. Next, the device agent re-generates the device fingerprint 506, and preferably encrypts a response to the request with the device agent's SIDH Session Key. The response is then communicated to the LDC. Once received, the LDC decrypts the device fingerprint and validates the same 510. The LDC also removes timestamps applied to the device fingerprint and performs a re-encryption of the device fingerprint. The LDC then validates the resulting encrypted device fingerprint against an existing Device ID for the particular device. This Device ID may be stored internally and permit validation only upon request from the LDC.

Figure 8B:
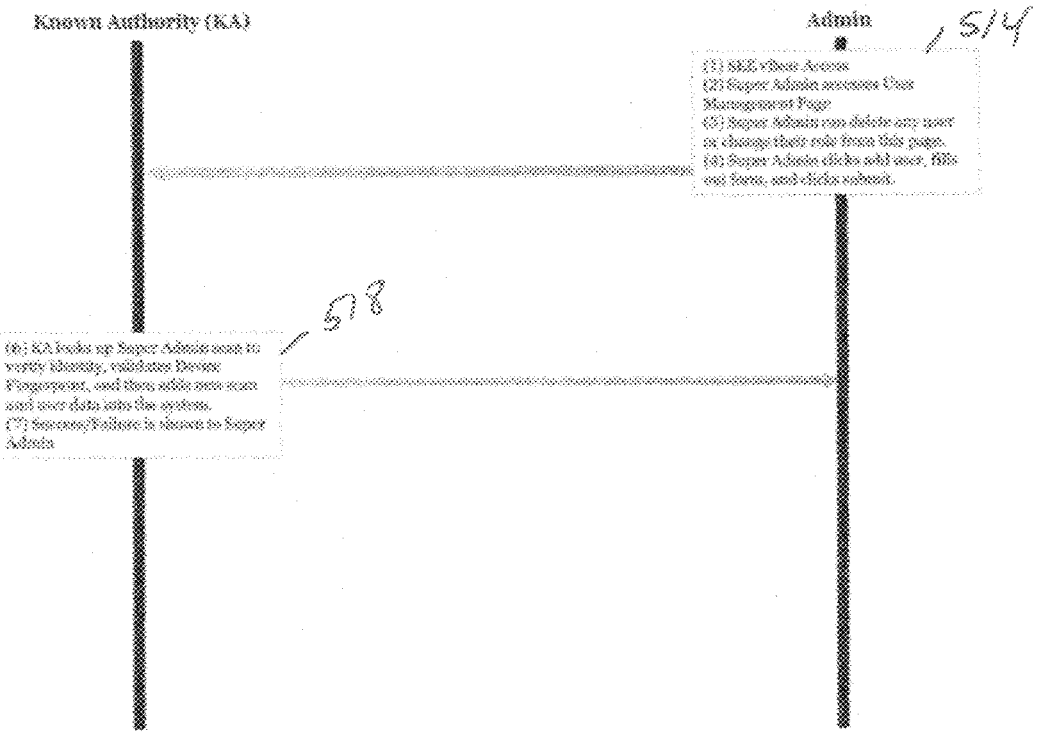
FIG. 8B illustrates a workflow process for adding an administrator to the system according to embodiments of the present disclosure.

Referring now to FIG. 8B, a process is shown for adding a new administrator to the system. Here, at least one administrator has already established access to the vBear module as described in connection with FIG. 7. Then, the super administrator accesses the User Management module 514, where the super administrator has rights to add a user, delete a user, or make changes to user roles for any user of the system. Here, the super administrator may choose to add a new user (as an administrator) and submits the request to the Known Authority. Next, the Known Authority looks up the super administrator to verify identity, and once verified validates a Device Fingerprint (see FIG. 8A) for the request 518. The Known Authority then adds the new Device Fingerprint new scan and user data into the system. The success or failure of the requested addition is conveyed to the super administrator.

Figure 8C:
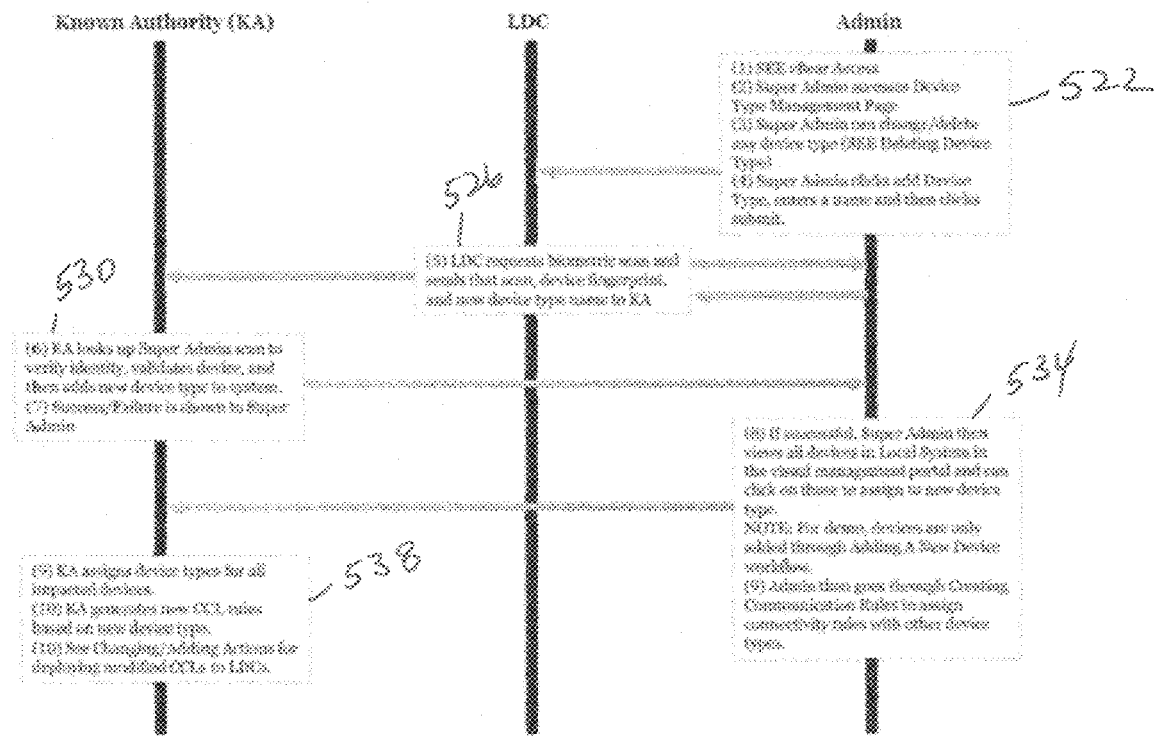
FIG. 8C illustrates a workflow process for adding a device type to the system according to embodiments of the present disclosure.

A process for adding a new device type is shown in FIG. 8C. As with adding administrative rights to a particular user, the super administrator can access the Device Management module and can add, delete or change a device type set up for the particular system 522. The super administrator may add a new device type by naming the new type and submitting the request to the LDC 526. Next, the LDC requests a biometric or other scan and communicates the results of the scan, the associated device fingerprint, and the new device type name to the Known Authority 530. Then the Known Authority looks up the super administrator's scan results to verify his or her identity, validates the device, and then adds the requested new device type to the system.

Figure 8E:
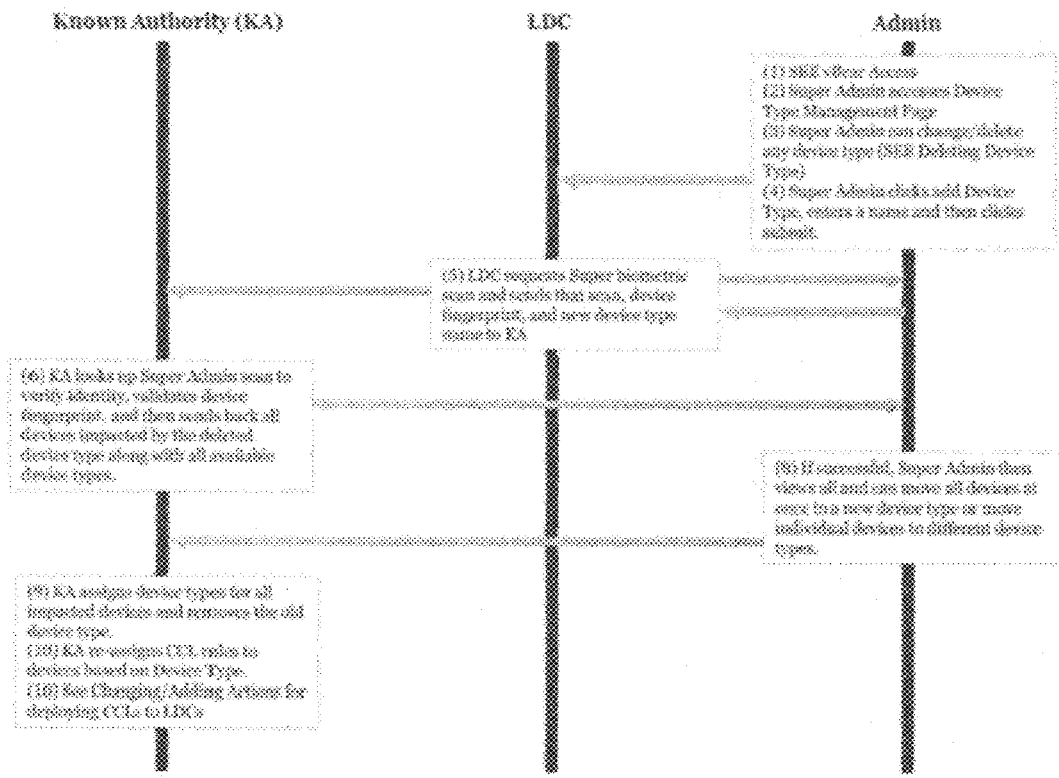
FIG. 8E illustrates a workflow process for deleting a device type from the system according to embodiments of the present disclosure.

Assuming the request is approved, the super administrator may then view all devices in the Local System, such as by way of the visual management portal, and may assign the new device type to one or more devices 534. Communication rules may also be assigned to the particular device types. These actions are also communicated to the Known Authority. The KA then assigns the device type for all impacted devices, and generates a new set of communication control list (CCL) rules based on the new device type 538. The process of deleting a device type is preferably accomplished in an equivalent manner, and is illustrated in FIG. 8E.

Referring to FIG. 8D, a process for adding a new device to a system is illustrated. At the new device, a Thin Agent Verifier is launched, which may be achieved through an administrator or remotely executed 542. The Thin Agent Verifier uses the main endpoint node and a first Timestamp A to generate a 32-bit Identifier and Device Install Keys (DIKs). The Thin Agent Verifier preferably encrypts the endpoint IP, the 32-bit Identifier and the DIK Public Key with the TACK Public Key. Ultimately, the information listed above is conveyed to the Known Authority. The KA looks up the TACK Private Key using, for example, an Ethernet Origin IP, and decrypts the information received from the new device 546. The KA may also calculate the device's 32-bit Identifier based on stored values to verify the decrypted and stored Identifiers match. The KA the preferably encrypts an AES Unlock Key with the DIK Public Key, and communicates the encrypted AES Unlock Key to the new device. The new device then goes through a decryption routine, uninstalls the Thin Agent Verifier, and establishes Secure SIDH Communications using the DIK Keys and TACK Public Key 560. The device may also perform BIOS fingerprinting, and sends the value(s) back to the Known Authority.

The KA uses fingerprint to stamp all Full Agent binaries and then sends Full Installer to Device 564. Then the Thin Agent runs a full installer on the device, and uninstalls the Thin Installer 568. Next, the new device generates a LDC Challenge based on the 32-Bit value and timestamp. Concurrently, the KA generates a LDC Challenge based on 32-Bit value and Timestamp A, and sends that to the LDC, preferably through an "Add Device" message 572. The LDC then submits the New LDC command to the device, and includes the LDC Challenge received from the Known Authority 576. If the LDC Challenge received matches with the LDC Challenge generated by the new device, all device, communications, a Virtual Thread Network (VTN) data is submitted to the LDC 580. The LDC then adds this new device to a global device ledger 584.

Figure 9:
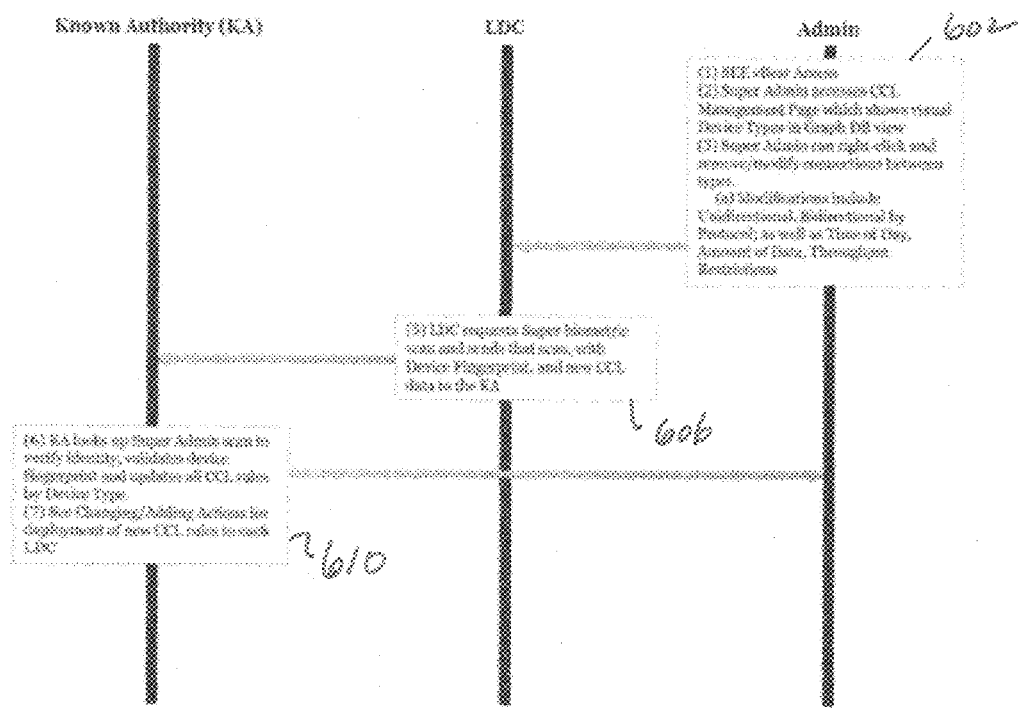
FIG. 9 illustrates a workflow process for creating communication rules according to embodiments of the present disclosure.

Referring to FIG. 9, a process for creating communication rules according to embodiments is shown. The super administrator may access the CCL Management module, which preferably comprises a visual display of device types in a graphical format, to remove or modify connections between device types 602. Super administrator modifications may also comprise unidirectional, bidirectional (by protocol), time of day, amount of data, and throughput restrictions. The super administrator communicates the changes to the LDC. The LDC requests a super administrator biometric or other scan, and sends the results of that scan with a device fingerprint, and new CCL data, to the Known Authority 606. The Known Authority looks up the super administrator scan and verifies the identity 610. If verified, the KA validates the device fingerprint and updates all CCL rules according to device type. The KA may also deploy changes/additional actions predicated upon the new CCL rules to each LDC.

The system may be queried to obtain the location and device name from the LDC. Alternatively, the system may be queried to determine if the device in an LDC, or if there is a parent LDC associated therewith. Further, a device key may be encrypted, along with a public key, and then transmitted to the LDC. Encrypted information transmitted to the LDC may further comprise: production run date and ID; production public key information; device type name; device location name; manufacturer ID; device name; device public key (and hash ID); and other information. The encrypted transmission to the LDC may further embed cloud domain information, preferably as metadata. The LDC preferably passes the transmission to the Main Domain Controller (MDC). This pass through may further comprise encrypting the cloud device ID with the LDC's public key and/or hash ID and may embed this information as metadata.

Additionally, the system may replace the cloud domain of a particular device with the matching MDC IP if an LDC has been identified. Then the MDC sends the encryption (gzip) package to the LDC. In this transmission, the endpoint public key is preferably assigned. Next, the LDC receives and forwards the encryption package to the endpoint. The LDC also stores the device public key assigned in the prior step. Next, the endpoint may use the device private key and hash to decrypt the Blockchain A value, as referenced above. Then the Blockchain A value may be used to unzip an encrypted installation routine, or utilize the device private key and hash to decrypt the installation routine. Once unzipped/decrypted, the endpoint may download and install the security package. This step of installation may cause the thin device agent to be removed or inactivated.

Figure 10:
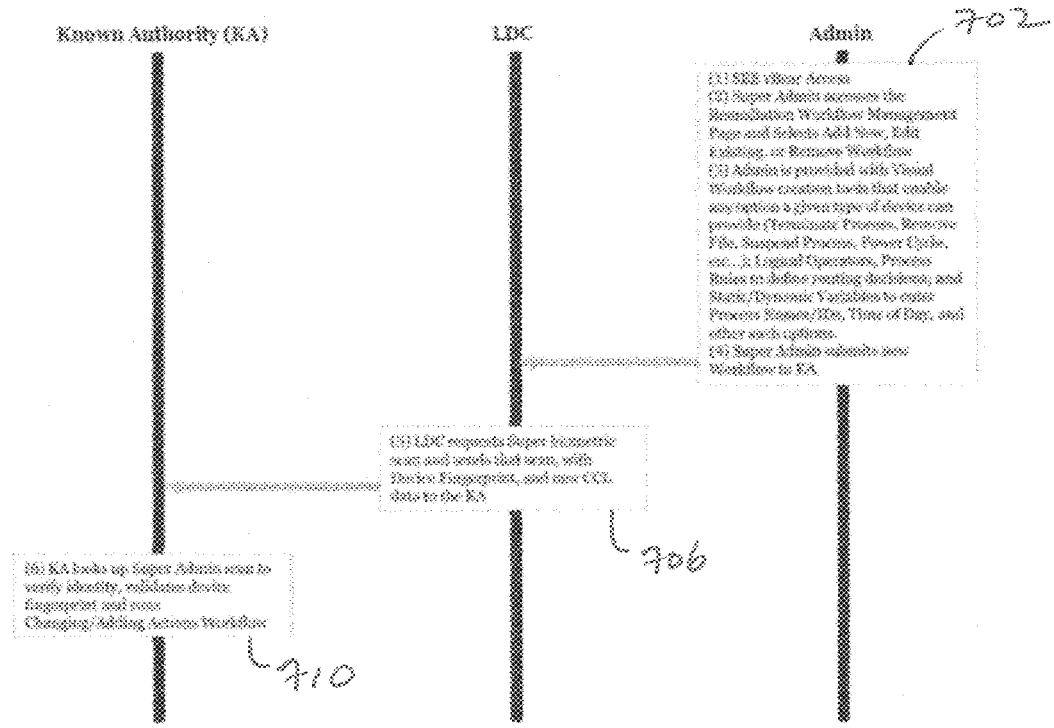
FIG. 10 illustrates a process for creating remediation workflows according to embodiments of the present disclosure.

In FIG. 10, processes for establishing new remediation workflows are illustrated. Preferably, the administrator has already established access with the vBear module as described above in connection with FIG. 7. Once completed, the super administrator accesses the Remediation Workflow Management module, where he or she may add a new workflow, edit an existing workflow, or remove a workflow 702. The super administrator is preferably provided with a visual display of the workflow tools provided in this module, which enable any option a given type of device can provide (Terminate Process, Remove File, Suspend Process, Power Cycle and others) along with logical operators, process rules to define routing decisions, and static or dynamic variables for entering process names/IDs, time of day, and additional options. The super administrator then submits the new workflow to the LDC. The LDC requests a biometric or other scan of the super administrator, and sends the scan results along with a device fingerprint and new communications control list data to the Known Authority 706. The KA then looks up the super administrator scan results, verifies the identity, and validates the device fingerprint 710. Once each verification and validation is completed, the KA runs an operation for changing/adding actions to established workflows.

The present disclosure also relates to processes for establishing secure communications between a user and a device on the local system. Here, the LDC preferably establishes an initial connection with the user, whereby a communication is sent to the user via the cloud and includes the list of devices stored in the LDC database. Next, the user sends a command through the cloud to the LDC, preferably with authorizations for one or more devices listed. Next, the LDC sends a command authorizing the device(s) according to the user's command sent to the LDC. Thereafter, in-band communications between the device and the controller are established.

Figure 11A:
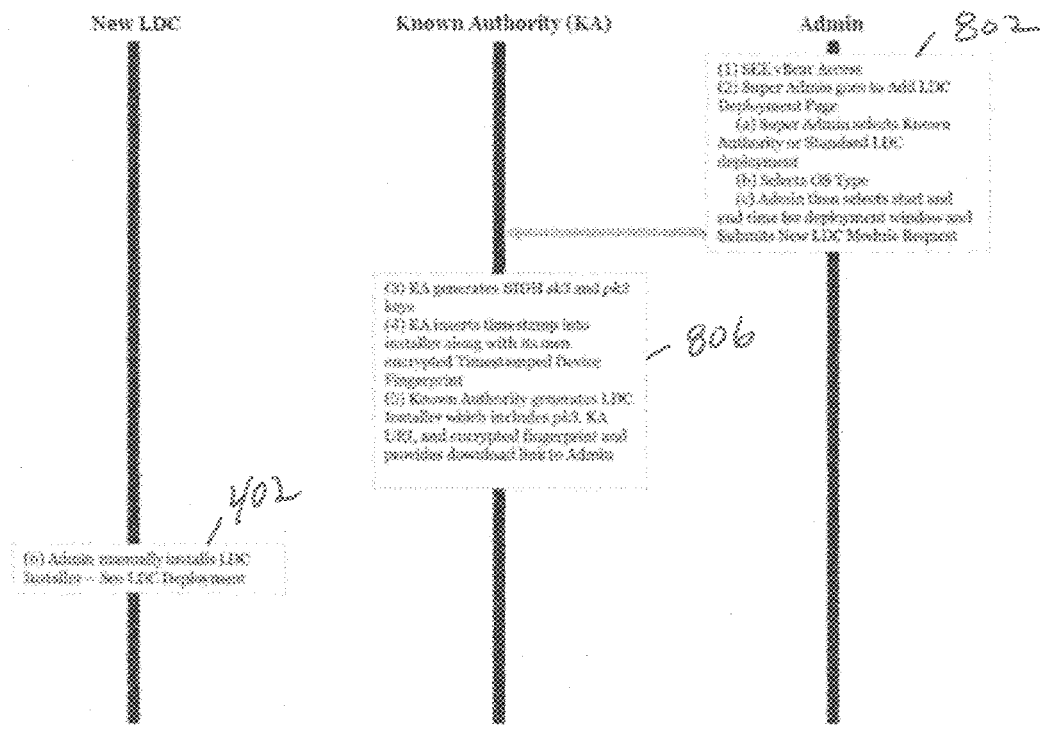
FIGS. 11A-11C illustrate workflow processes for local domain controller and associated device deployment according to embodiments of the present disclosure.
Figure 11B:
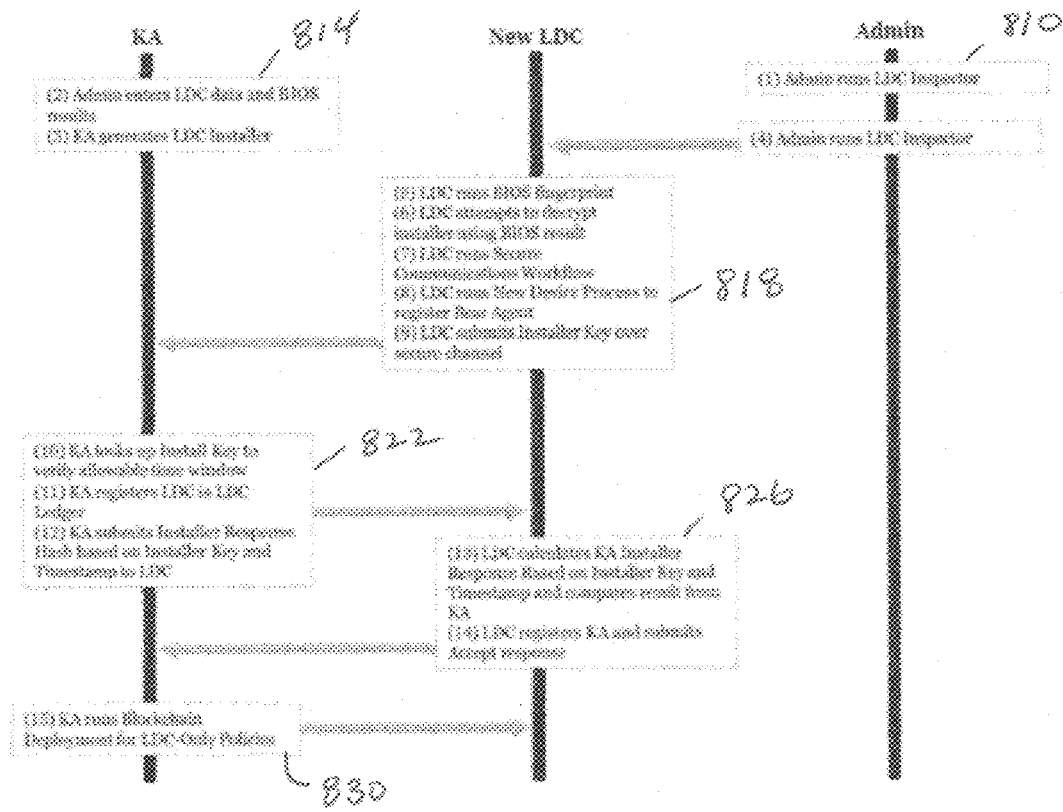
Figure 11C:
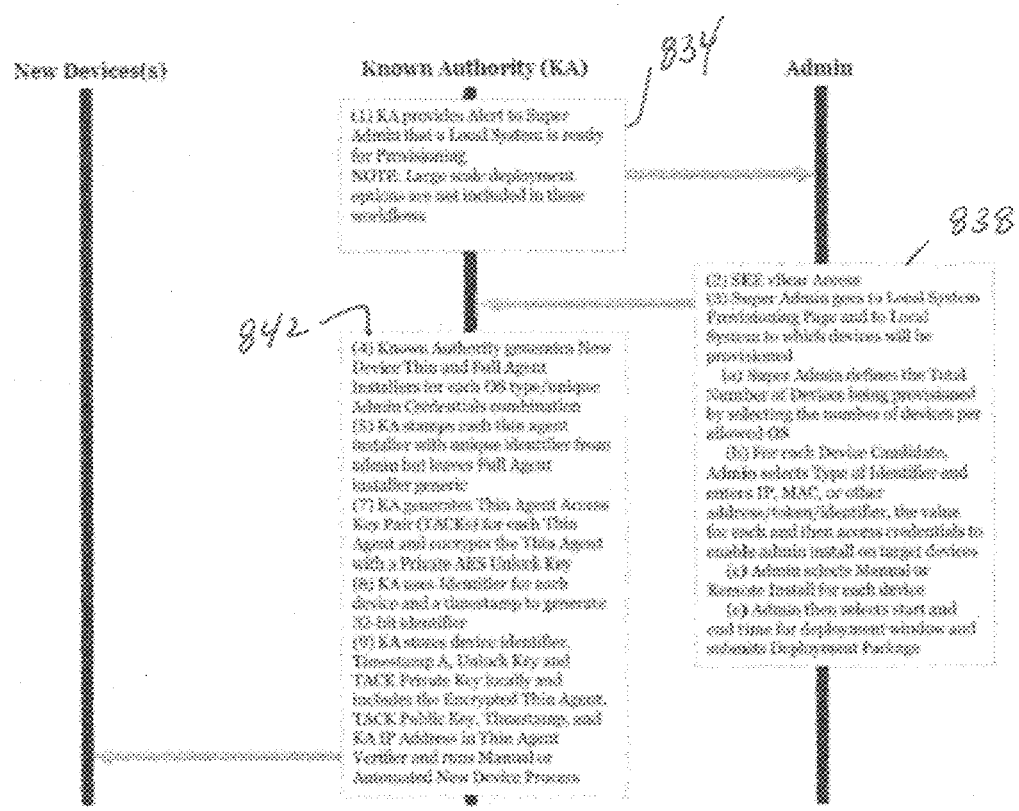

Referring now to FIG. 11A-C, various workflow processes are shown relating to deployment. In FIG. 11A, a workflow relating to LDC deployment is shown. In a preferred embodiment, after vBear module access has been established, the super administrator may access an LDC Deployment module, select either a Known Authority or standard LDC deployment, and selects the type of OS for the requested deployment 802. The super administrator preferably selects a start and end time for the deployment, and communicates the new LDC request to the Known Authority.

The KA generates sk3 and pk3 keys using SIDH, and inserts a timestamp into the LDC Installer along with its own encrypted, timestamped device fingerprint 806. The Known Authority then provides a link or downloaded file containing the LDC Installer, which includes the pk3 key, URI of the Known Authority, and encrypted device fingerprint. The super administrator may then access the LDC Installer and complete the installation. Once installed, LDC Deployment may proceed. As shown in FIG. 11B, the administrator may run a LDC Inspector routine 810. The administrator may also enter LDC data and BIOS results for submission to the Known Authority 814. The new LDC, which has received the LDC Installer, then runs a BIOS fingerprint and attempts to decrypt the LDC Installer using the BIOS results 818. Next, the LDC runs a Secure Communications Workflow, a New Device process to register the device agent, and submits its Installer Key, preferably over a secure channel. The KA then looks up the Install Key to verify the allowable time window for the deployment 822. The KA also registers the new LDC in the LDC Ledger.

The KA may then submit an Installer Response Hash, based on the Installer Key and the timestamp, to the LDC. The LDC calculates the KA Installer Response based on the Installer Key and timestamp and compares the results with the equivalent information received from the KA 826. The LDC the registers with the KA and accepts the response. Finally, the KA runs a Blockchain Deployment for LDC-Only policies 830.

Referring to FIG. 11C, processes for device deployment are shown. Deployment may be triggered by the KA providing an alert that a Local System is ready for provisioning 834. Then the super administrator may access a Local System Provisioning module and specify for the Local System which devices will be provisioned 838. This process may involve one or more subprocesses, including: (a) defining the total number of devices being provisioned by selecting the number of devices allowed per the pertinent OS; (b) for each device candidate, selecting the type or identifier and entering IP, MAC, or other address/token/identifier; (c) accessing credentials to enable administrator installation on a target device; (d) selecting manual or remote install for each device; and (e) selecting start and end time for the deployment window. Once the selections are made, the administrator communicates the device deployment request to the Known Authority.

The Known Authority then generates a new device Thin Agent and Full Agent Installers for each OS type/unique administrator credential combination 842. The KA then stamps each Thin Agent Installer with a unique identifier from the administrator. The KA preferably does not complete this step for the Full Agent Installer. The KA then generates a Thin Agent Access Key Pair (TACK) for each Thin Agent and encrypts the Thin Agent with a Private AES Unlock Key. The KA may use the Identifier and a timestamp to generate a 32-bit identifier for each device. The KA then stores the device identifier, Timestamp A, Unlock Key and TACK Private Key locally. The KA may also provide the Encrypted Thin Agent, TACK Public Key, Timestamp, and KA IP Address to the Thin Agent Verifier, and run manual or automated new device deployments.

If local data is found to be present, that data is processed and the transaction recorded in the local Blockchain registry. Metadata may also be recorded for further routing other data, such as any relevant module data. After the transmission is received by the endpoint, alerts may be generated, particularly if unknown data is received. These alerts may be sent to the LDC, other domain controller or to the cloud application(s).

In relation to several processes, subprocesses for Blockchain processing may be described. for example, a device may request a new policy or module and transmit that request to the LDC. This request may trigger an optional step of sending an update from the cloud to the device, which may include a policy/module update. Alternatively, the LDC may send a Blockchain package to the lower level device with the requested policy or module. In another embodiment, the LDC acquires the policy/module update from the MDC. Regardless, all databases are securely replicated and the transmissions recorded in the LDC database.

The Blockchain security protocols described above may be followed, whereby the Blockchain package received by the lower level device is sent through the encryption process and ultimately replaced with each new policy/module associated with the type of update requested. Next, the encryption/decryption process may trigger a reporting message to the LDC. If the message decryption fails, an error message may be sent to the LDC and recorded in the local system database.

for the system may also be configured to react to identification of an invalid device on the local system. If an error message is received, or during boot operations the system receives an indication there is invalid hardware, a message is transmitted to the LDC. The transmission may be Blockchain encrypted using a provisioning ID. Once received by the LDC, the LDC may in turn transmit that message to the MDC and/or to the cloud. If transmitted to the cloud, authorized hardware changes and synchronization authorization may be supplied back to the LDC and, if authorized, a new dataser and Blockchain-encrypted device ID may be delivered back to the trusted zone. In the event the invalid device ID is not authorized, the LDC/MDC may send a command to shut down or other information to troubleshoot the error. Once received, the transmission from the LDC/MDC is Blockchain-decrypted and the invalid device is either updated or shut down, depending on the authorization received.

In embodiments, the Known Authority may employ Supersingular Isogeny Diffie-Hellman (SIDH) key exchange and/or SIDH key encapsulation methods. The use of SIDH provides even greater security over the exchange of public and private key pairs. By utilizing SIDH, devices may exchange public or private keys in any order, or simultaneously. In this manner, any two devices (or any one device and a LDC/MDC or Known Authority) may engage in the SIDH key exchange protocol for establishing a common and secret session key. The secret session key may then be utilized to establish a "secure-channel" by which the device (s) may exchange messages securely using symmetric encryption under the derived secret session key.

Figure 12:
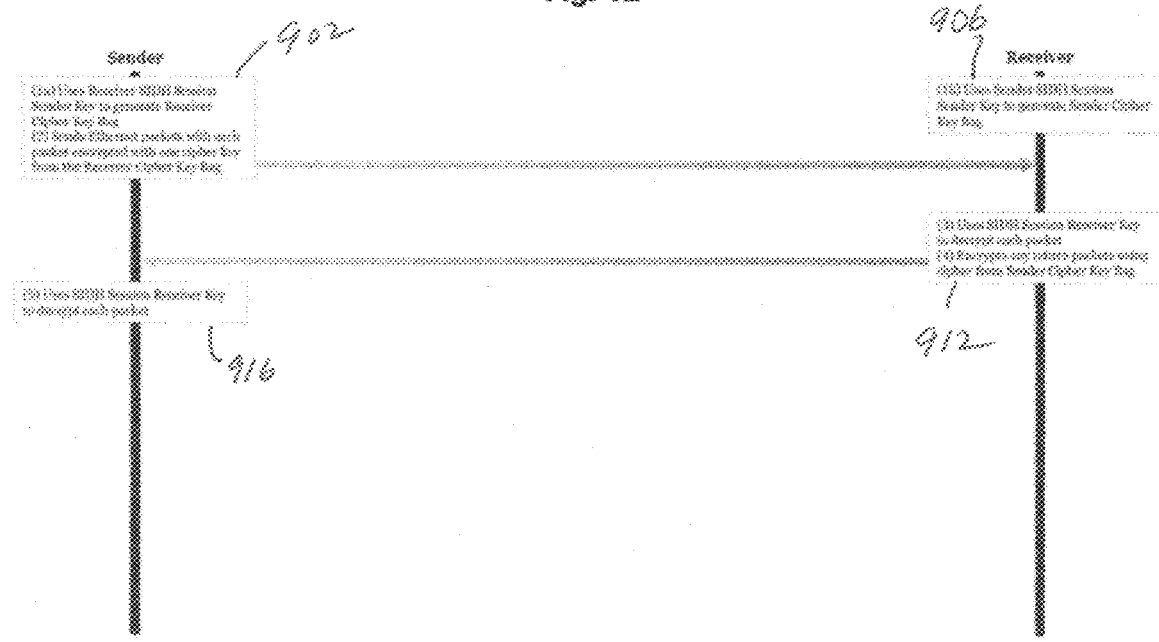
FIG. 12 illustrates a workflow process for SIDH key exchange and encryption according to embodiments of the present disclosure.

Referring to FIG. 12, steps for SIDH Key exchange and encryption are illustrated. Here, the sending party uses a SIDH Session Sender Key from the receiver to generate a Receiver Cipher Key Bag 902. The receiver then uses a SIDH Session Sender Key from the sender to generate a Sender Cipher Key Bag 906. The sender communicates one or more Ethernet packets, preferably with each packet encrypted, with one cipher key (for each packet) from the Receiver Cipher Key Bag. The receiver then uses the SIDH Session Receiver Key to decrypt each packet, and then encrypts return packets using a cipher from Sender Cipher Key Bag 912. Then the sender uses the SIDH Session Receiver Key to decrypt each packet, thereby completing the SIDH encryption cycle 916.

The system preferably comprises a device policy for locating and identifying devices within the local system. The device policy contains a device type ID for each device, and may further comprise a hardware ID. Thus, the device policy maintains the list of possible hardware components along with paths for obtaining identifiers associated with each component. By paths, this disclosure is intended to refer both to physical paths as well as dynamic data or function calls to make local BIOS connection.

The device policy also determines the minimum number of hardware to collect information from, and may also comprise a maximum. At initialization, the device policy may randomly select and assign hardware IDs within the maximum range. The position of the selected hardware component(s) is stored within the hardware ID string. In this manner, the device policy established a unique ID for each device component in the local system.

Once located, an ID gen module creates an actual device ID and the device ID string. The module may randomly select an ID for the ID string, or may generate a random alphanumeric string. This is repeated until each device is used at least one time. Preferably, the hardware ID string contains the start and stop positions at the end of this process in the event the process needs to be replicated. Then the device IDs are stored in the local trusted zone, and preferably a hash ID is also generated and transmitted to the LDC using the Blockchain encryption described above. If a hash ID is generated, the rules for hashing may be stored and retrieved from the device policy or other CCLs at the device level.

Figure 13A:
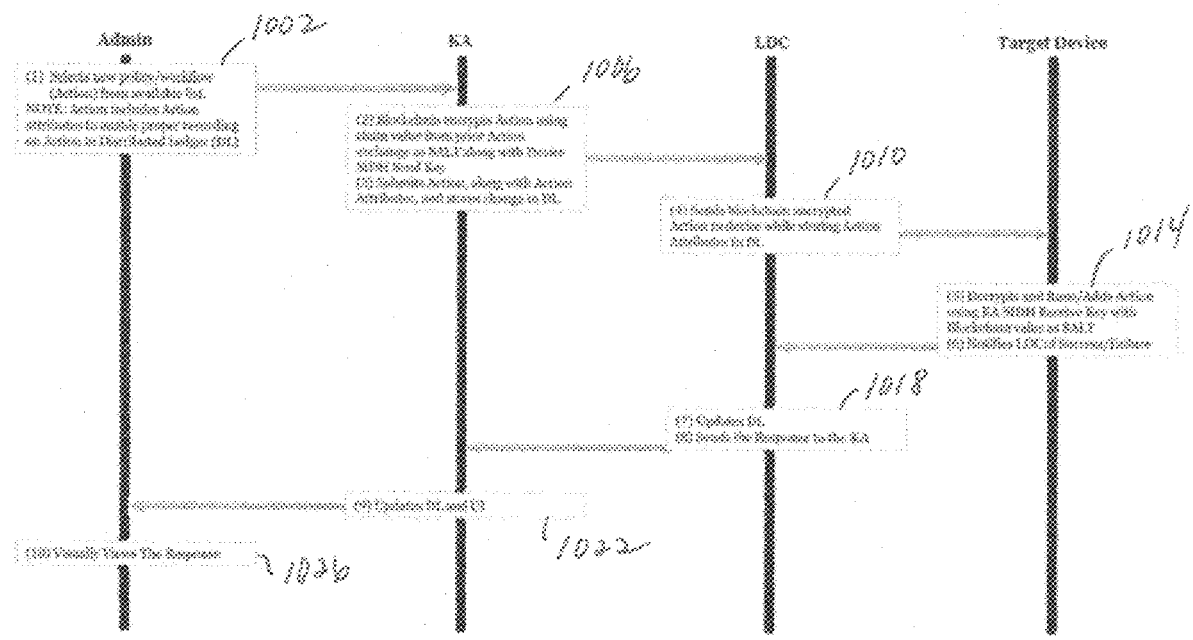
FIG. 13A-13B illustrate processes for adding or changing actions or remediation workflows according to embodiments of the present disclosure.
Figure 13B:
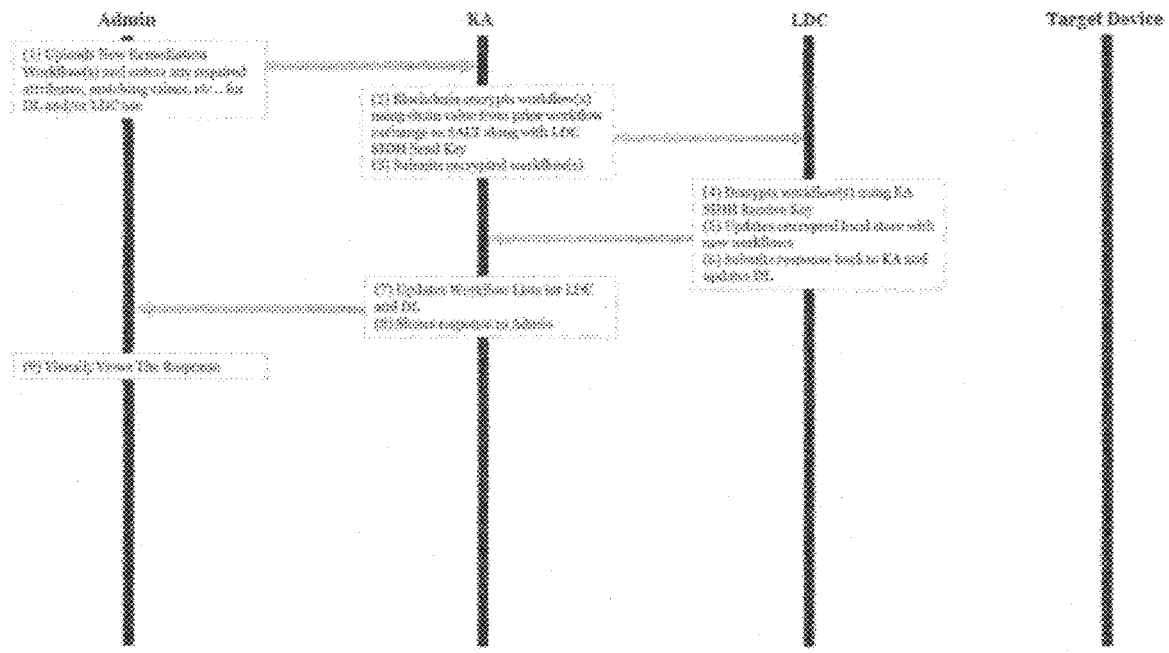

Referring to FIGS. 13A-13B, additional processes relating to making changes or additions to the system are shown. FIG. 13A relates to processes for making changes or additions to actions taken. First, the administrator selects a new policy/workflow (Action) from the available list 1002. Next, the KA Blockchain encrypts the Action using a Blockchain value from a prior Action exchange (as SALT) along with a Device SIDH Send Key 1006. The KA then submits the Action, along with any Action Attributes, to the LDC and stores the change in the device ledger. The LDC then receives and sends a Blockchain encrypted Action to the target device, while storing the Action Attributes in the device ledger 1010. The target device decrypts the Action and runs the Action using the KA provided SIDH Receive Key with the Blockchain value as SALT 1014. Once completed, the target device notifies the LDC of the successful (or failed) operation. The LDC receives the notification from the target device, and preferably updates the device ledger 1018. The LDC then forwards the response to the Known Authority. The KA updates the device ledger and UI 1022, and the administrator is able to visually see the response 1026. A similar process ensues when a request is made to change or add a remediation workflow, as depicted in FIG. 13B.

Figure 14:
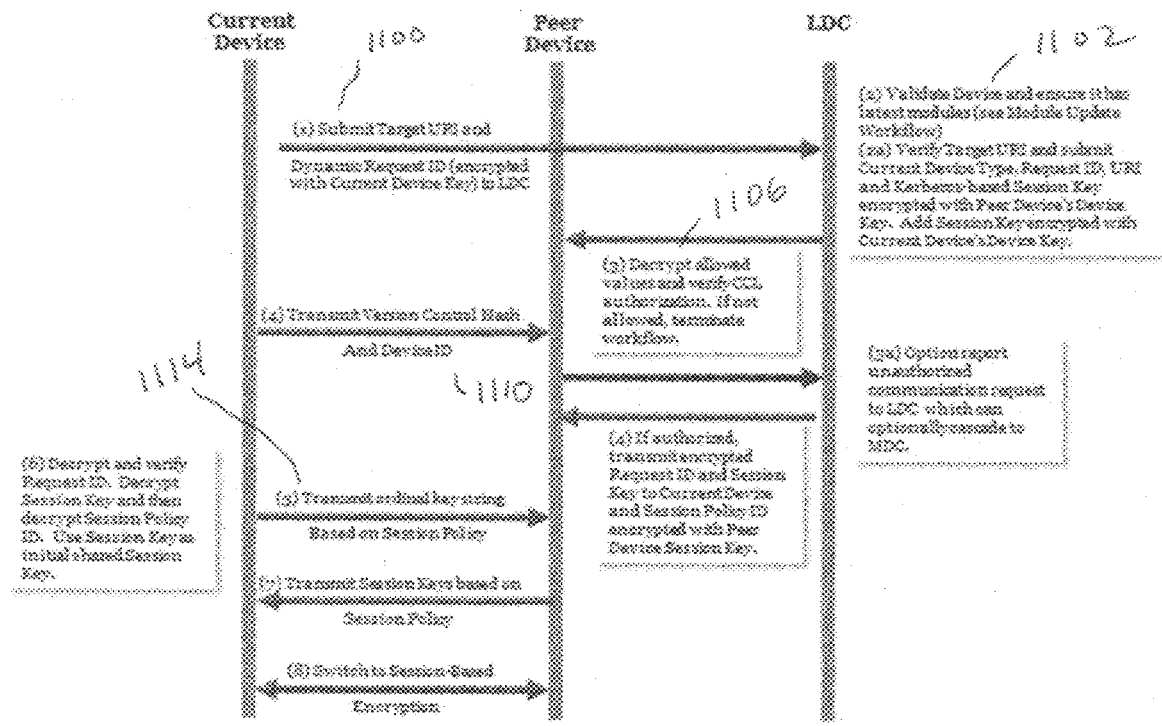
FIG. 14 illustrates a workflow process for initiating peer-based device communications according to embodiments of the present disclosure.

Referring to FIG. 14, the system and methods disclosed herein further enable peer-based communications over a local network. Initiation of peer-based communications is shown in FIG. 14, wherein the device may submit a dynamic request for an ID (encrypted with the current device key) and transmit the request to the LDC 1100. The LDC then validates the device and the request, verifies a target URI and submits the session key with the encrypted device key 1102.

This may further comprise a Kerebos-based session key encrypted with the peer device's device key. The encrypted values are verified and authorization is obtained 1106. Once alerted of this status, the current device transmits a version control has and device ID to the peer device and, if authorized by the LDC, a request ID and session key is transmitted to the peer device 1110. Next, the current device transmits an ordinal key string based on the session policy to the peer device, and the peer device transmits session keys to the current device based on the session policy 1114. From this point, peer-to-peer device communication is allowed as shown in FIG. 14.

Figure 15:
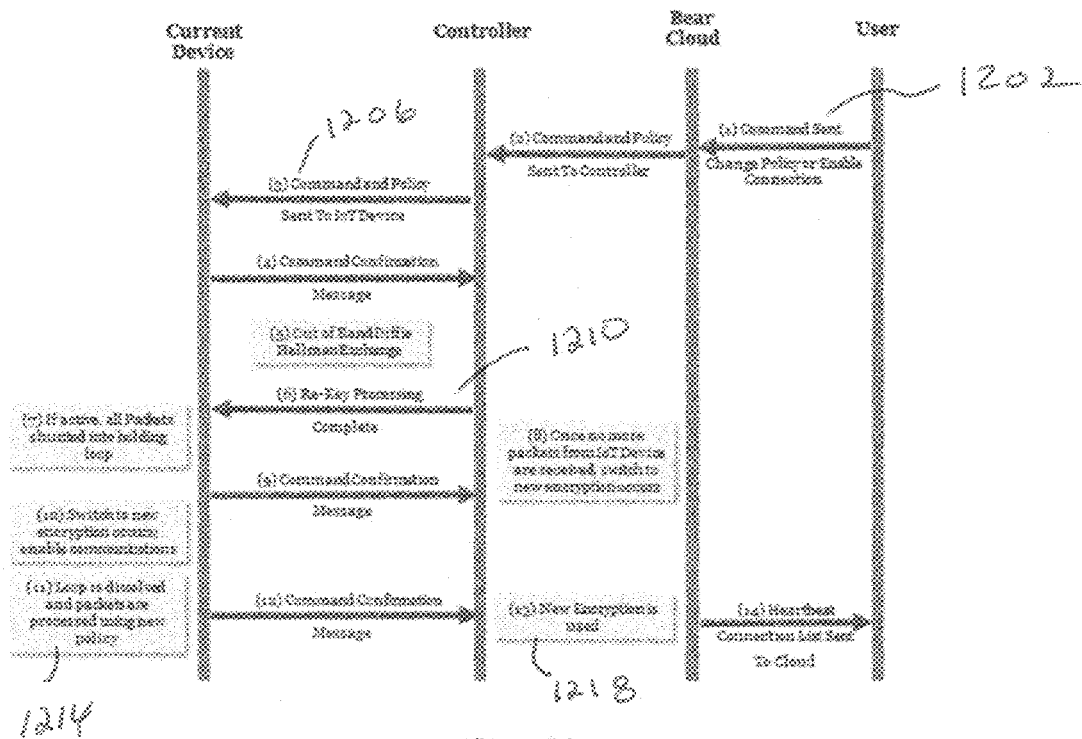
FIG. 15 illustrates a workflow process for implementing a policy change according to embodiments of the present disclosure.

Referring now to FIG. 15, a workflow diagram depicts a process for making a policy change. In this diagram, the system permits security changes and has communications enabled. Initially, a command is sent from the user through the cloud to the controller 1202. The command and policy to be changed is the transmitted to the device 1206. The command is confirmed by the device, and then the controller reprocesses the symmetric key as described above 1210. The device may place all packet handling into a holding loop while the new policy change is updated. Next, the command and re-key processing is confirmed by the device, and once the controller confirms that no more packets are being received from the device (i.e., it is safe to enact the policy change), the controller switches to the new encryption. The holding loop, if enabled, is dissolved and the current device sends a command message confirming the policy change 1214. The new encryption policy is then stored in the controller, and a message may be sent back to the user confirming the connection list 1218.

Figure 16A:
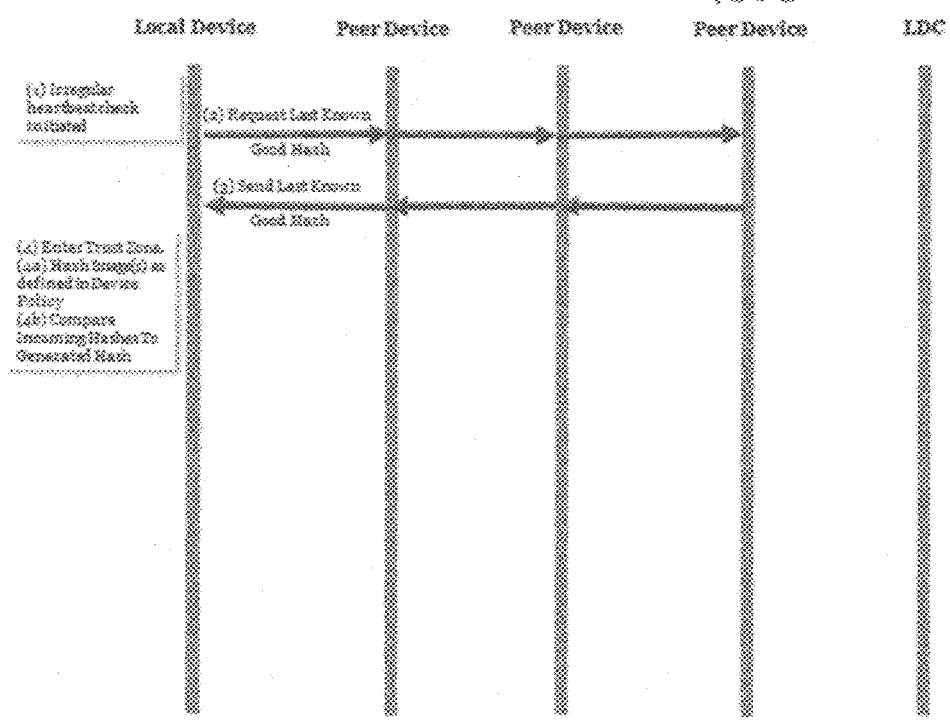
FIG. 16A illustrates a workflow process for policy enforcement according to embodiments of the present disclosure.
Figure 16B:
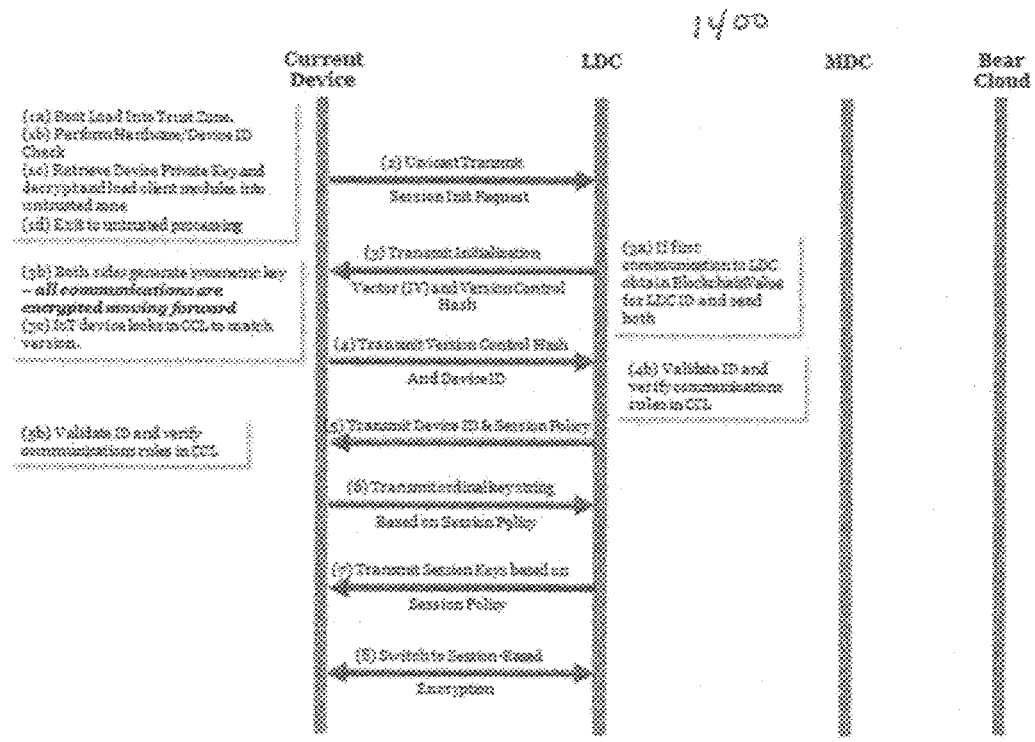
FIG. 16B illustrates a workflow process for device initiation according to embodiments of the present disclosure.
Figure 16C:
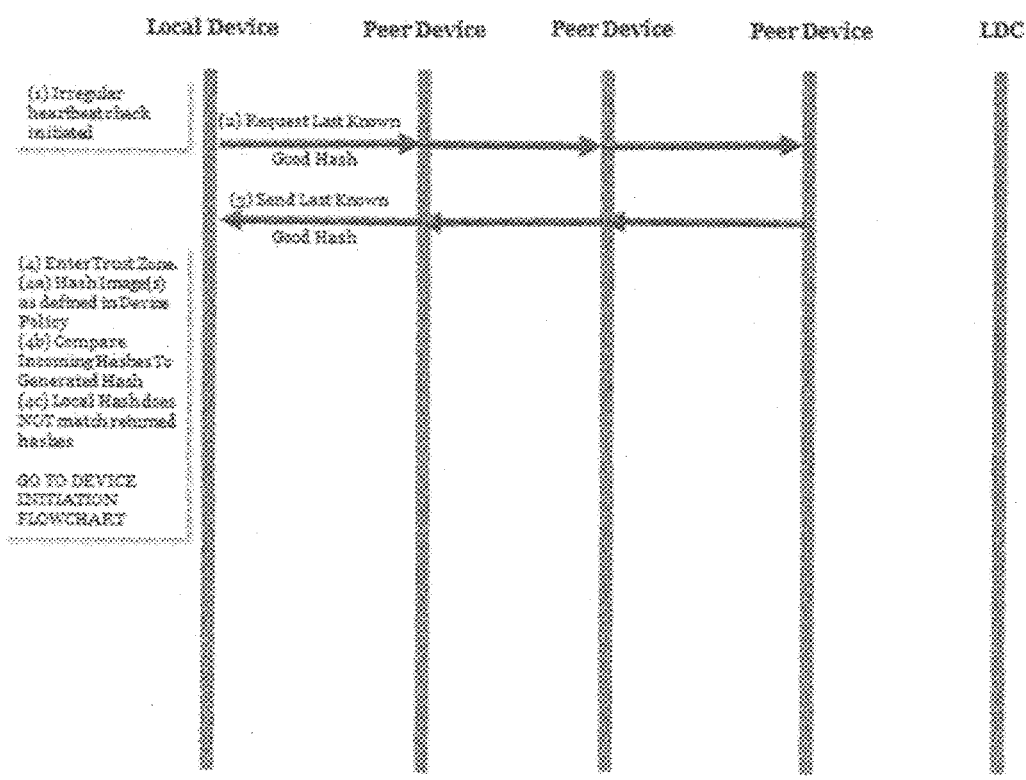
FIG. 16C illustrates another workflow process for policy enforcement according to embodiments of the present disclosure.
Figure 16D:
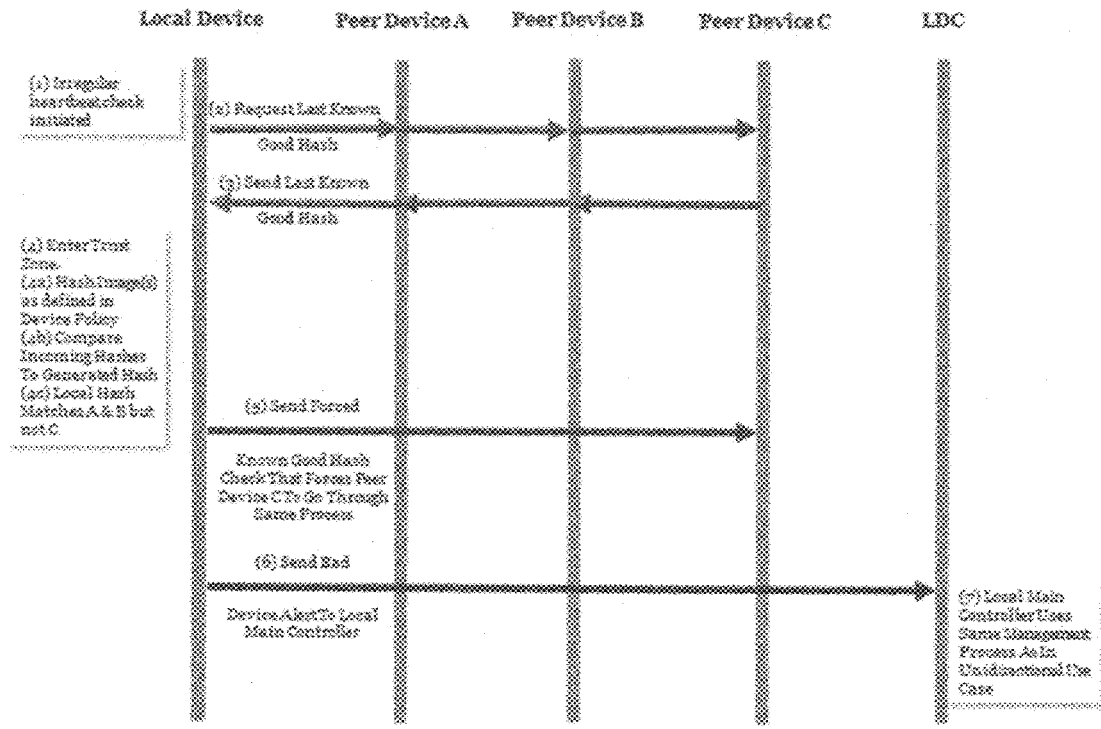
FIG. 16D illustrates yet another workflow process for policy enforcement according to embodiments of the present disclosure.
Figure 16E:
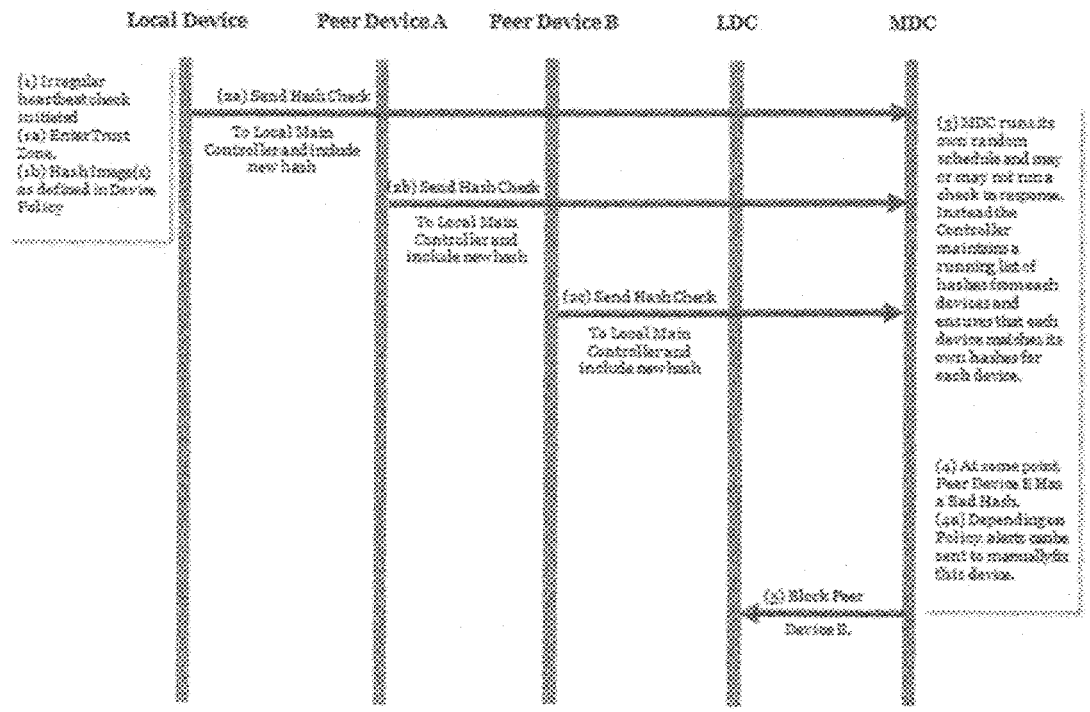
FIG. 16E illustrates yet another workflow process for policy enforcement according to embodiments of the present disclosure.

In FIGS. 16A-E, various policy enforcement workflow diagrams are shown. These policy enforcement workflows include bidirectional communications, where all conditions are normal 1300 (FIG. 16A), bidirectional communications, dataset update 1400 (FIG. 16B), bidirectional communications, majority matches but not local 1500 (FIG. 16C), bidirectional communications, most match local but one if wrong 1600 (FIG. 16D), and unidirectional communications, bad hash detected 1700 (FIG. 16E).

Figure 17:
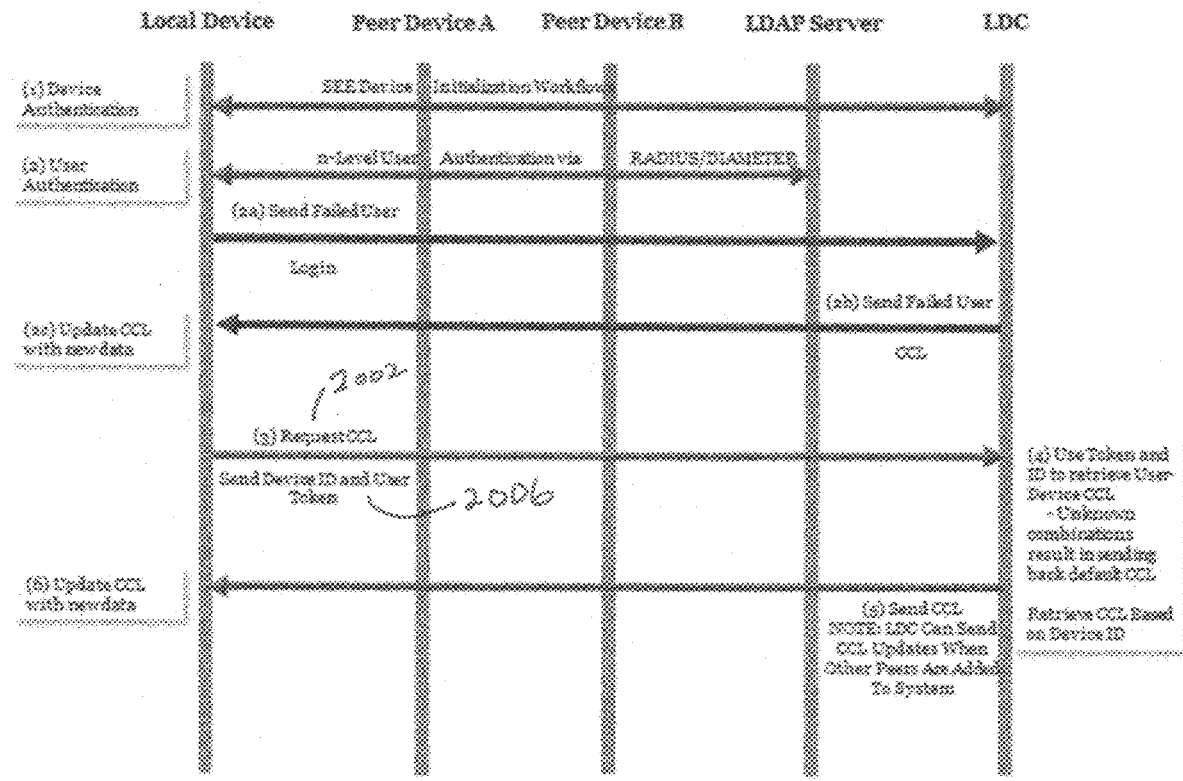
FIG. 17 illustrates a workflow process for generating a communications control list according to embodiments of the present disclosure.

Referring now to FIG. 17, a diagram showing CCL generation steps is provided. If the local device has been successfully initiated, and the user authenticated, the CCL may be generated by requesting the CCL from the LDC 2002. The LDC then uses a user token and the device ID from the local device to retrieve the correct CCL based on the device ID 2006. Net, the CCL is sent from the LDC to the local device. In addition, the CCL may be automatically updated when other device peers are added to the system, such as peer device A and peer device B shown in FIG. 17.

Figure 18:
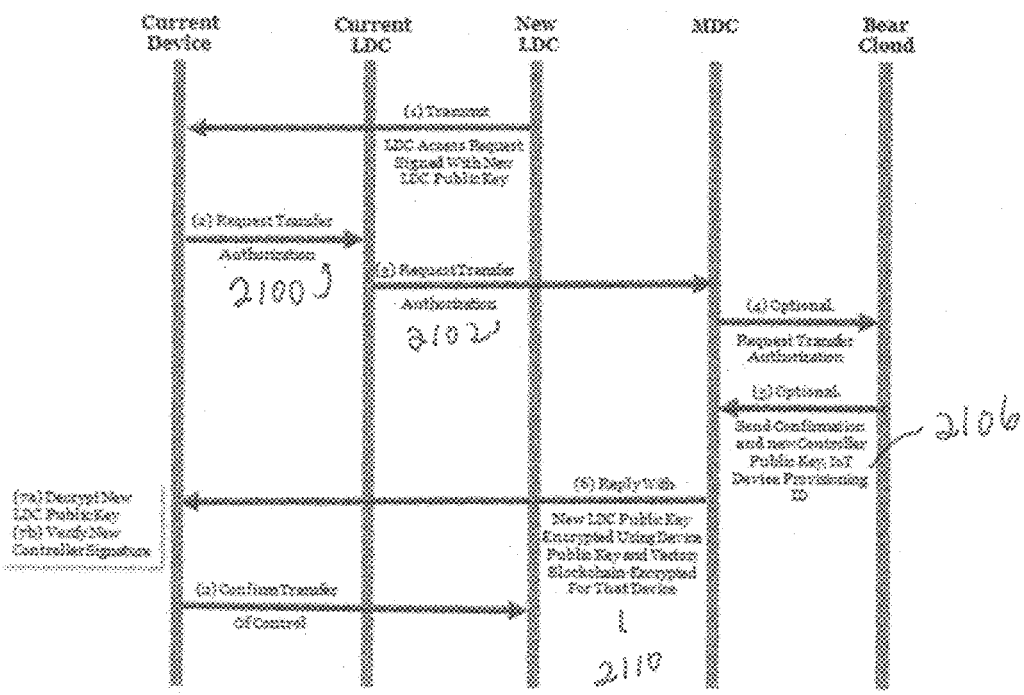
FIG. 18 illustrates a workflow process for changing local domain controllers according to embodiments of the present disclosure.

Referring now to FIG. 18, it may be necessary to periodically change LDCs. In this scenario, the current LDC and new LDC operate simultaneously to facilitate the exchange. The device can send a request to transfer authorization to the new LDC 2100, which is received by the current LDC. The current LDC then transmits a request to the MDC 2102, and the MDC may pass that authorization request to the cloud. Confirmation of authorization is sent to the device with the new LDC public key 2106, preferably encrypted using the device public key (Blockchain-encrypted for the specific device). The device then decrypts the new LDC public key and verifies the new LDC signature 2110. The device then sends a confirmation of transfer of control to the new LDC.

According to certain embodiments, methods of employing and managing the systems described above are further disclosed. For instance, a method of installing a configuring a device, according to one embodiment, involves the steps of: (1) initiating an image/installer upload request; (2) determining whether there is more than one device type present in the system; (3) selecting the device type; (4) determining if there is more than one storage option present in the system; (5) selecting the storage option; (6) entering the title, description, version number and optional hash; (7) uploading image/installer; (8) determining if there is a hash provided, and whether hash matches image; (9) performing differential analysis; (10) storing metadata; (11) generating a differential hash for each device type; (12) determining whether multiple differentials are present; (13) combining a quantity of differentials into a major update; and (14) storing the data in the device repository.

According to another embodiment, a method for boot operations is disclosed, comprising the steps of: (1) powering the devices on; (2) performing a core process boot; (3) initializing and activating trusted processing; (4) applying policy(ies) to build device IDs; (5) retrieving current device ID from trusted zone; (6) determining if devices match; (7) running an invalid device ID workflow; (8) using a private key to decrypt and load desired modules; (9) shutting down validation modules and exiting trusted computing zone (10) sending a unicast call to LDC consistent with device initiation workflows; (11) determining whether there are new images/modules; (12) allowing boot load process to continue; (13) re-entering trusted computing; (14) blockchain decrypting modules and images; (15) loading modules and images into untrusted computing space; and (16) determining whether updates have been made.

Figure 19A:
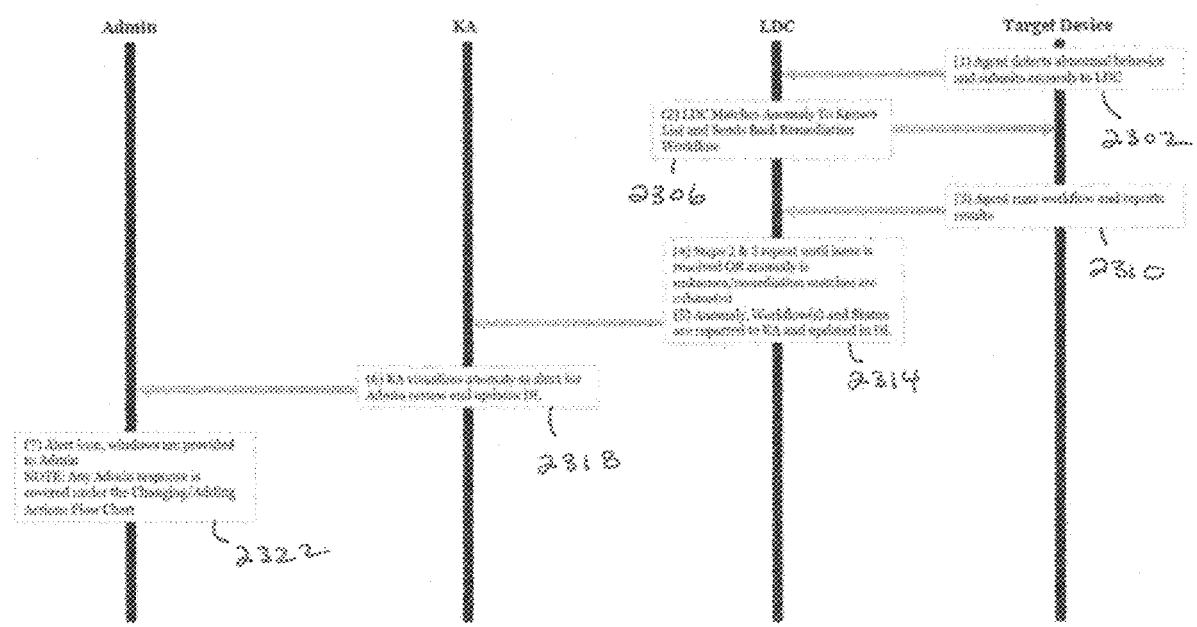
FIGS. 19A-19B illustrate workflow processes for creating alerts for known and unknown events according to embodiments of the present disclosure.

Additional processes are illustrated in connection with FIGS. 19A-20C. In FIG. 19A, processes for sending alerts in response to a known event are illustrated. Here, the target device preferably has a device agent installed. The device agent is configured to detect abnormal behavior. Once a qualifying event occurs, the device agent submits data relating to the anomaly to the LDC 2302. The LDC receives the anomaly and matches the data to a known list of anomalies, returning to the target device the appropriate remediation workflow 2306. Next, the device agent runs the remediation workflow and reports the results of the same to the LDC 2310. These two steps are repeated until the anomaly is completely resolved or the application of remediation workflows in response to known events is exhausted 2314. Data relating to the anomaly, workflow(s) and status are reported to the KA and updated in the device ledger 2318. The KA may provide a visual alert for an administrator and provide its own update to the device ledger. Then an alert icon or equivalent indicia may be displayed or otherwise communicated to the administrator 2322.

Figure 19B:
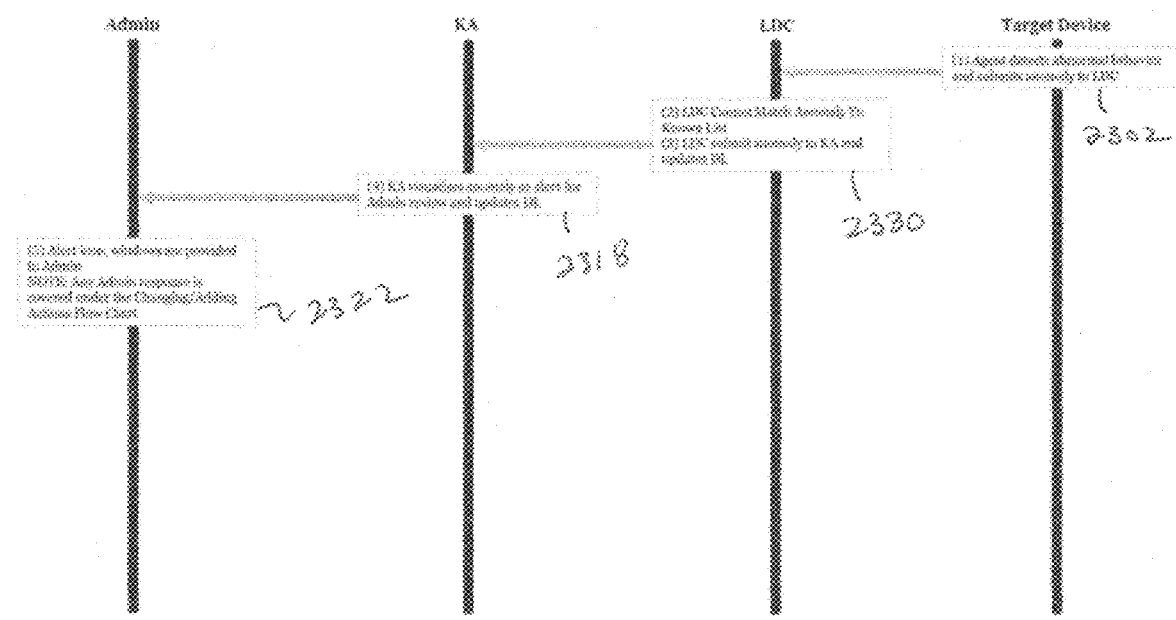

Referring now to FIG. 19B, a similar process is shown for sending alerts in response to an unknown event. In this scenario, whenever the LDC cannot identify a match to the received anomaly from the known list of anomalies, the LDC submits the anomaly data to the KA and updates the device ledger 2330. The administrator may receive an alert in the same fashion as described above in connection with FIG. 19A.

Figure 20A:
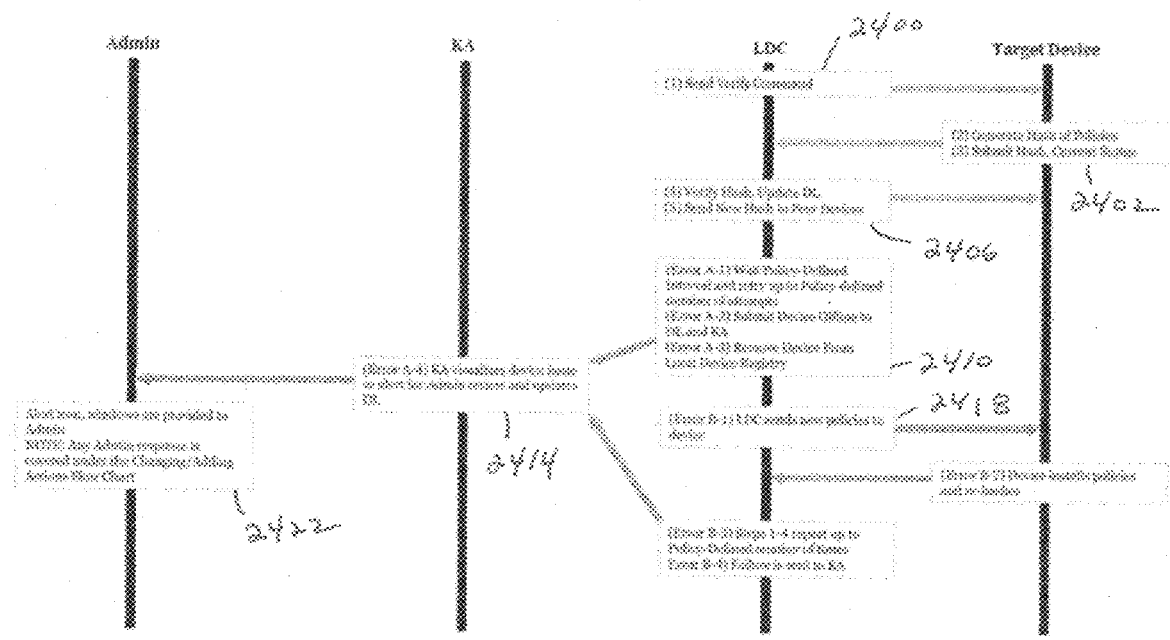
FIGS. 20A-20C illustrate workflow processes for verifying status and performing system checks for various components of the system.
Figure 20B:
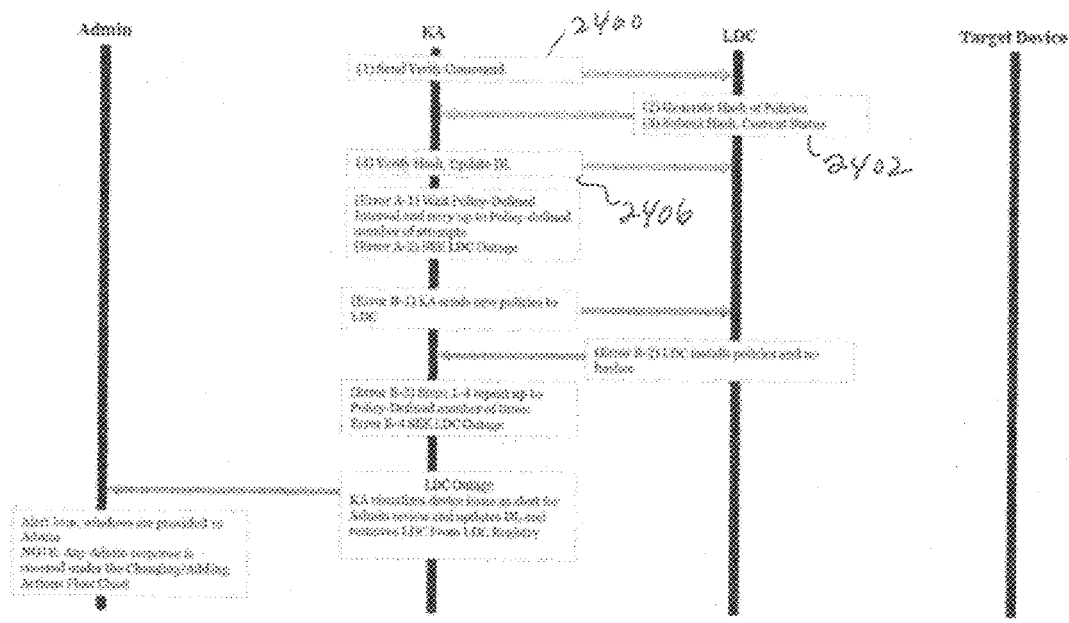

Referring to FIG. 20A, a process for verifying a device's status is shown. First, the LDC may send a verify command to the target device 2400. The target device then generates a Hash of the device policies, and submits the same back to the LDC with a current status response message 2402. The LDC may then verify the received Hash, updates the device ledger, and sends a new Hash to peer devices of the target device 2406. In the event this process results in one of several error messages, the LDC may then send messaging to the Known Authority, which visualizes the device issue, preferably as an alert, for an administrator to review 2410. The KA also updates the device ledger 2414. In response to certain error messages, the LDC may send new policies to the target device to replace or substitute the original policies 2418. Then the target device installs the new policies and re-hashes the same as described above, sending the Hash to the LDC. This process may be repeated until all error messages are either reported or addressed. In turn the administrator is preferably provided with an alert icon 2422. A similar process is illustrated in FIG. 20B with respect to verifying the status of a LDC (as opposed to a device).

Figure 20C:
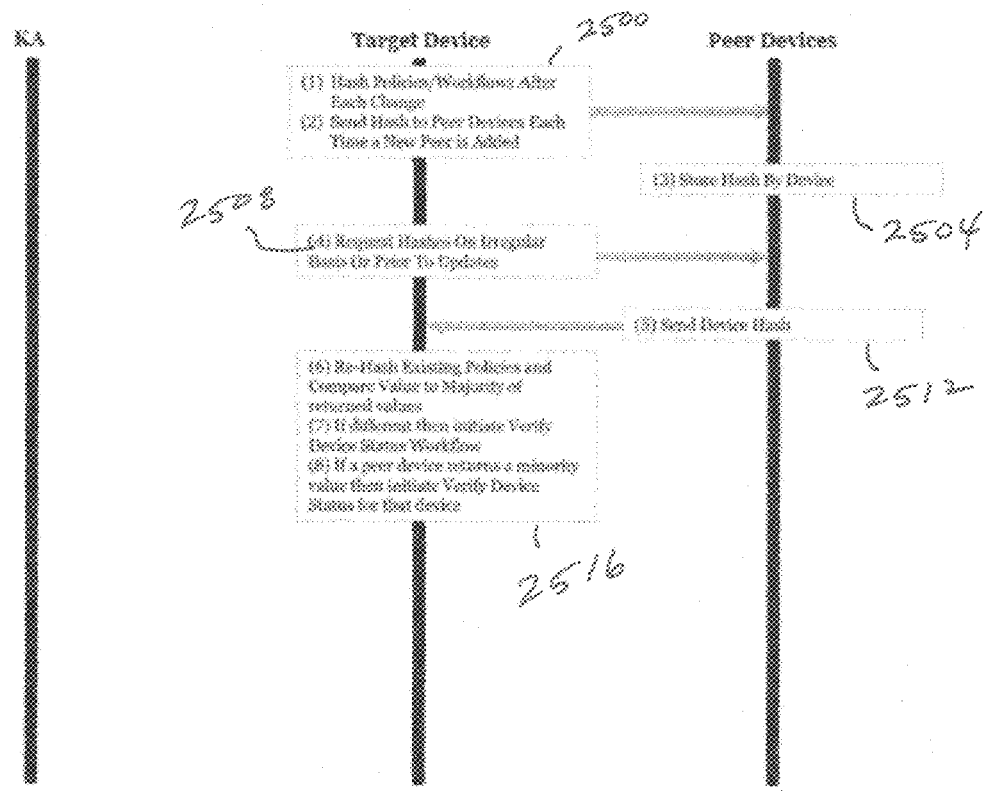

In FIG. 20C, a process is shown for performing a peer status check. Here, Hash policies and/or workflows may be communicated to peer device(s) after each change to a target device 2500. Next, the target device sends a Hash to the peer device(s), including each time a new peer is added to the system. The peer device(s) then store the Hash, preferably by device the Hash is received from 2504. The target device may then request Hashes from the peer device(s), including on an irregular basis, or prior to subsequent updates 2508. The peer device(s) may respond by sending the device hash to the target device 2512. The target device in turn may re-Hash existing policies, and compare value of the re-Hash to the majority of returned values 2516. If a predetermined difference is observed, the system may initiate a Verify Device Status workflow. If a peer device returns a minority value, the system may initiate a Verify Device Status for that specific peer device.

Figure 21:
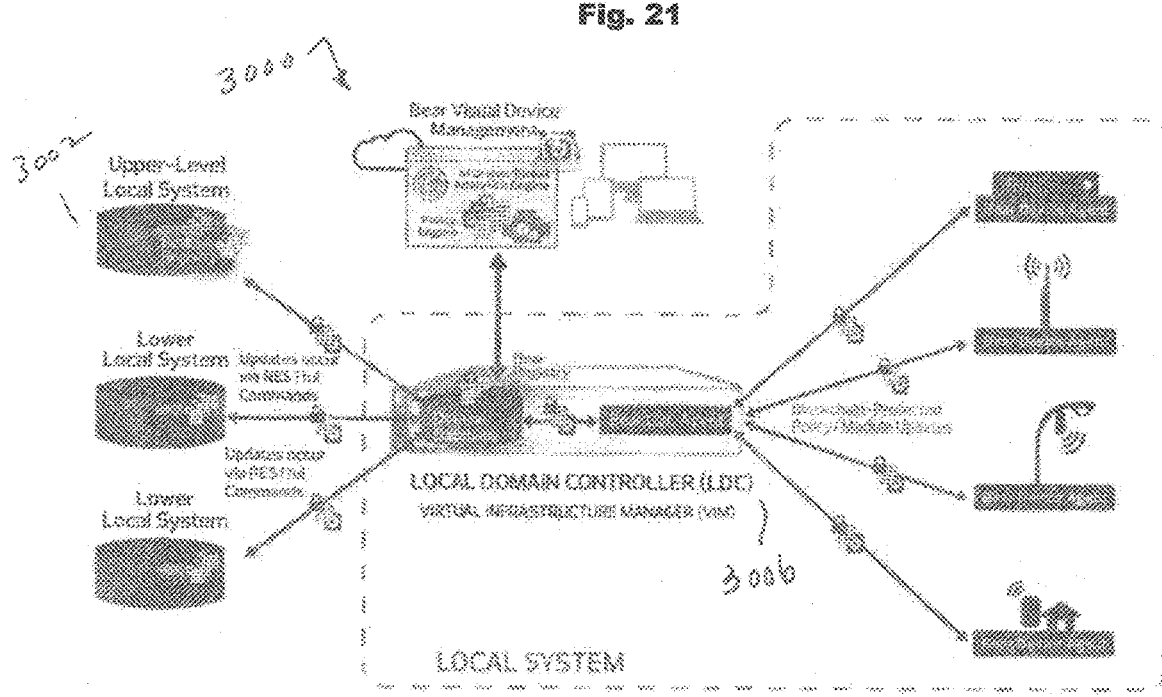
FIG. 21 illustrates aspects of a system according to another embodiment of the present disclosure.

Referring now to FIGS. 21-26, further embodiments of the present disclosure will now be described. As shown in FIG. 21, the architecture 3000 of this particular embodiment is comprised of Local Systems 3002, which are each preferably associated with a Local Domain Controller (LDC) 3006. Local System connections may be configured to run over any protocol local to the associated LDC. In turn, LDCs are hierarchically organized in any manner defined by an administrator, and may connect and communicate over a multitude of possible protocols. Devices in the Local Systems are preferably connected to or are in communication with the LDC.

The LDC serves multiple purposes, including a RESTful Command & Control system, time-series server and storing/performing optional processes to enable a distributed Known Authority scheme. Together, the LDC also serves to enable a Virtual Private Enterprise (VPE) that removes physical locations, protocol barriers and security concerns from an enterprise system. This architecture preferably enables the VPE through the LDC(s) and at least one Master Domain Controller (MDC), which provides a High Security Deployment (HSD) process (described in greater detail below in relation to FIG. 23). The MDC preferably comprises (1) a datastore of all licenses allowed for a given customer, which is preferably encrypted, (2) the Master Device Registry for the system, and (3) a global version of the vBear module, in which resides a Visual Management System.

The MDC may be structured and operate similarly to any LDC of the system, but is differentiated by its position at the top level of the system architecture, and that the MDC maintains the master lists for all subsidiary systems. The MDC is the last authority for many operations, although in certain instances operations may be pushed to an LDC.

According to this embodiment, the system architecture is therefore comprised of one MDC and one or more optional LDC(s), which are virtual nodes and may be run either on their own equipment or within the confines of existing devices. Being virtual, the MDC/LDC may even be configured to run on servers, laptops, iPads, tablets or equivalent computer hardware. To this end, the system architecture employs a highly secure method of deployment that immediately sets internal security on the device level, and restricts access throughout the lifetime of that node. Alternatively, in those cases wherein a deployment has too few LDCs to emulate multiple LDC constructs, the MDC comprises the ability to operate in this manner through an internal provisioning system.

Figure 22:
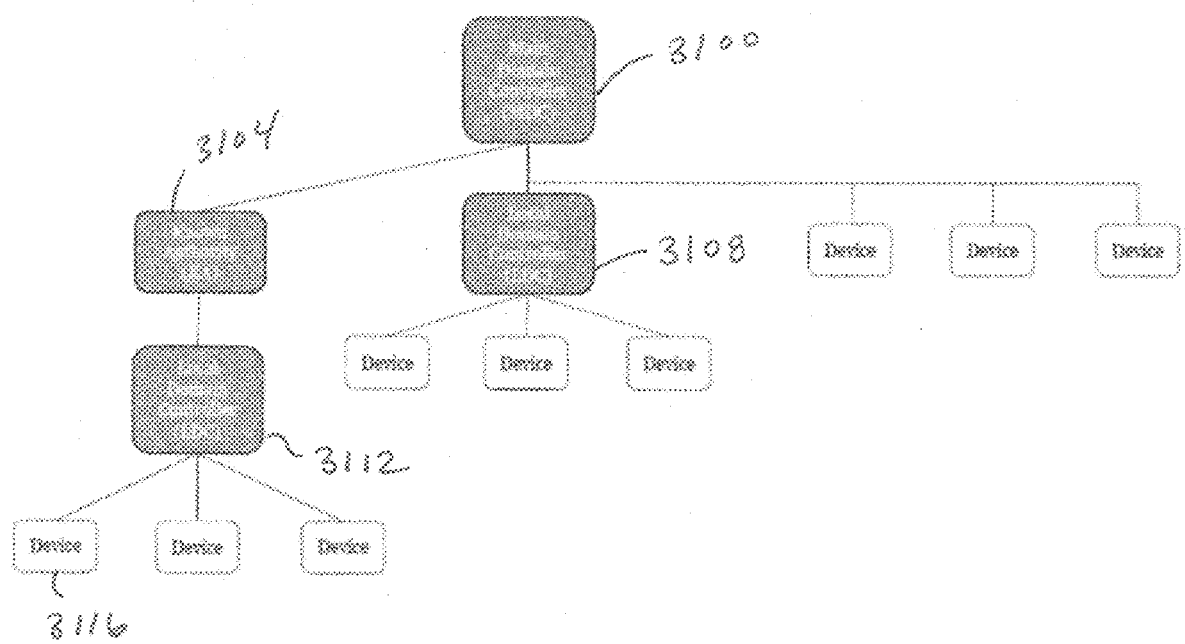
FIG. 22 illustrates aspects of a system according to yet another embodiment of the present disclosure.

Another embodiment is illustrated in FIG. 22. In this embodiment, the system comprises at least one main domain controller (MDC) 3100, at least one Known Authority 3104, at least one local domain controller (LDC) associated with the MDC 3108, at least one local domain controller (LDC) associated with the Known Authority 3112, and a plurality of devices 3116 configured to register and validate through the Known Authority. In this embodiment, the MDC 3100 may serve as both an LDC and a Known Authority. However, in preferred embodiments an LDC cannot serve as a Known Authority. A Known Authority operates through an associate LDC to control and command devices on a Local System. The previously described vBear module may operate on any LDC, KA or MDC. In this manner, the workflows and processes described above may occur through the interaction and communication between the MDC, KA and associated LDCs, ultimately to any target device on the Local System.

Referring back to the processes stored and executed by the MDC/LDC, the main processes of deployment may be organized in the following categories: (1) MDC/LDC High-Security Deployments or HSDs (a highly-protected system of creating new LDC instances); (2) LDC Local Device Discovery (focusing on discovering and installing thin agents on locally-connected devices); (3) Thin Agent Registration (focused on the time-based registration of a device to the Local System and the LDC to the device); (4) Device Registry (one of the distributed ledgers used in the system); (5) Session Initiation (which preferably relies on several out-of-band processes and one Ethernet packet for initiation); (6) Virtual Admin Channel (the out-of-band channel used to monitor and administrate devices); and (7) Blockchain-Based Policy/Module Deployment (secure transmission and recording of updates throughout the system). Each of these processes are described below.

Once a device is registered, a highly secure Virtual Admin Channel exists between known devices and a given LDC. The LDC also has a secure channel of communication to its upper-level LDC/MDC, and blockchain protection has been established. Deployment preferably begins with an administrator providing endpoint address information (or providing a deployment workflow) for the desired devices and network. The administrator then selects the operating system used for those devices/network, and provides an administrator account on the device. A system architect may then execute a routine, such as a remote script, on the targeted device that pushes over a thin agent. The thin agent preferably follows a Secure Registration process, which is described in greater detail below, to securely install a full version of the device agent. In those cases where a direct deployment is not possible, the deployment can be installed from an authorized USB device or through an appliance delivery model. At this point, the initiating device and the MDC/LDC have established a secure admin connection.

In embodiments, the device agent immediately applies its policies to commence management of processes on a selected device. The device agent may further coordinate all device communications moving forward from the point of initialization. In order to install safely, the system architecture may initiate a Secure Processing Mode on each device, complete installation, before returning to normal processing.

Once the MDC/LDC has at least one device agent running, the LDC may proceed with installing software including, by way of example but not limitation: encrypted datastore software; secure distributed RESTful system software; time server software; and deployment workflow engine software. In addition, or alternatively, the LDC may install a Known Authority (KA) software package. Each of these are described in turn below.

The encrypted datastore uses a rotating set of keys to separately encrypt different areas of importance for running the MDC/LDC, which may include one or more of the Device/Connection Registries, Policies, Licenses, Workflows, and Remediation. The encrypted datastore preferably includes identification and management of unique process threads to ensure data protection in memory. The encrypted database preferably runs local to the vBear module, any may employ a vBear specified communication channel or "pipe."

In the secure distributed RESTful system, the MDC and any associated LDCs communicate through RESTful "calls", which enable an out-of-band command and control system. These calls can be used to update the encrypted datastore, trigger workflows or trigger modules up and down the system enterprise. These commands or "calls" may be redirected into the Virtual Admin Channel, which are subject to a highly protected, modulating encryption scheme.

The time server software employs "time seeds" defined as a cipher value, plus an expiration timestamp, to carefully monitor and store time-sensitive or time-dependent communications to devices in the system.

The deployment workflow engine software is preferably configured to implement deployment policies, and/or enable a workflow engine software module to process one or more of the deployment policies.

Figure 23:
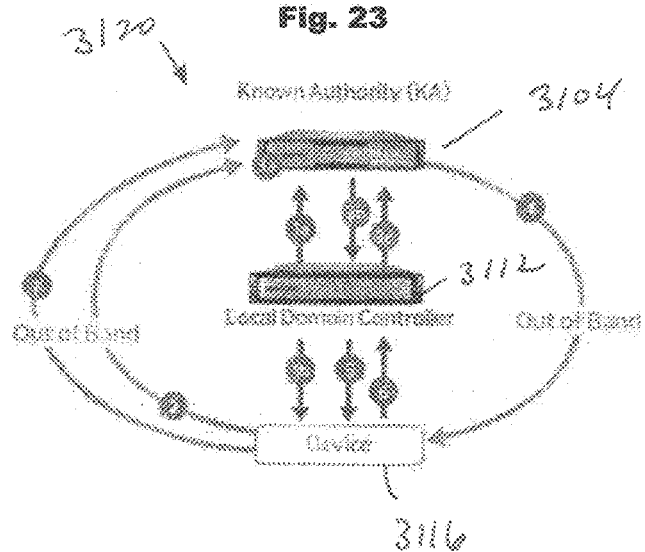
FIG. 23 illustrates various communications between a known authority and a local domain controller according to embodiments of the present disclosure.

Referring now to FIG. 23, the Known Authority software package may comprise: (1) the previously discussed vBear module; (2) the LDAP Integration module; (3) a licensing module, which may itself comprise a licensing registry; and (4) a secure key store. In this capacity, the licensing module may facilitate managing licenses granted to a particular customer via a private distributed ledger, which is preferably stored in the licensing registry. The secure key store contains keys used to access various registries.

Figure 24:
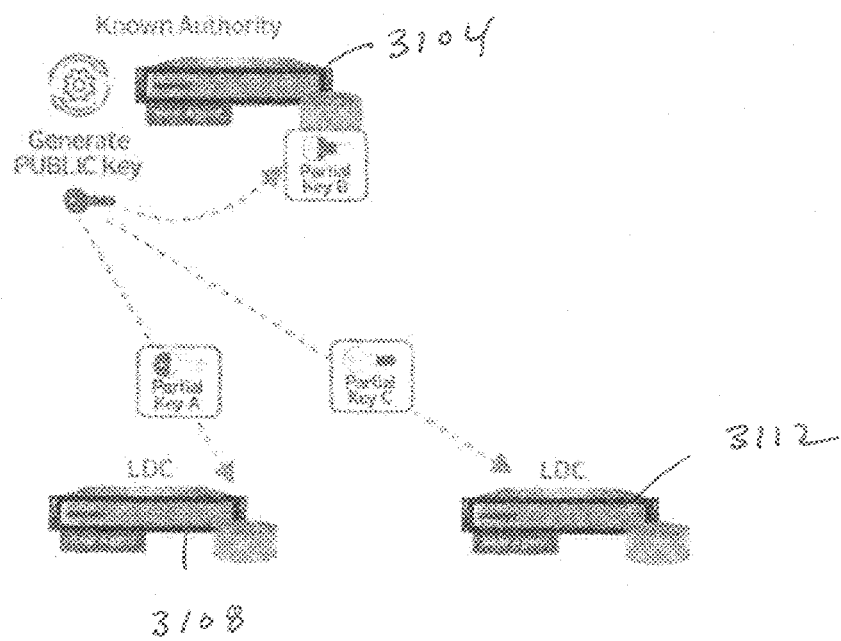
FIG. 24 illustrates aspects of the system that relate to generating a multi-part key according to embodiments of the present disclosure.

Referring now to FIG. 24, the Known Authority software package 3120 may implement a split key approach to providing such access, wherein different Known Authorities 3104 maintain different pieces or parts of a particular key. Hence, a "split" key can only be assembled by obtaining the required pieces or parts from the respective Known Authorities. In embodiments, policy-based requests must be received by each Known Authority possessing a piece of a request key prior to release of the split key pieces.

The MDC is by default the Known Authority for a Local System, and is the main point of secured updates and any workflow remediation. As new LDCs are deployed, the administrator may assign a LDC as another Known Authority. This assignment may be done directly or through a deployment policy.

Through this deployment model, even before the vBear module enables access to a user, the underlying threads are controlled by the device agent. In preferred embodiments, only the vBear module may access the encrypted datastore, whose thread is managed by the device agent. In turn, the vBear module leverages its own policies to determine what data, if any, to deploy to an end user. Through this deployment model, the system can quickly and safely reach into every local domain in an enterprise.

In embodiments, the system comprises at least two different types of device agents—a thin agent and a full agent—both of which contain all dependencies in their deployments. When being deployed into an operating system, the device agent interfaces with the operating system in order to function properly. In a typical enterprise, the principal points of delineation are Linux (including embedded Linux, Unix, & Android); Windows (all versions); and Apple (all versions). The purpose of the thin agent is to determine which of these versions needs to be deployed to a given device.

The thin agent serves at least two purposes. First, the thin agent can be provisioned when a device is manufactured. Second, the thin agent acts as a proxy and is used to install a full agent at a later time. In this embodiment, "provisioning" refers to the process whereby the thin agent is configured to find the latest possible version of the full agent when activated.

In embodiments, a particular LDC will scan its local system across any protocols as determined by an LDC administrator. The corresponding device discovery may also be run manually, wherein any discovered and unknown devices are visually displayed to an administrator, who then must select each device to commence deployment.

This process may alternatively be automated with one or more templates configured to lock down devices at an appropriate scale. For example, administrators may lock down deployment by a specific operating system, a specific port profile, particular IP address(es), or based on responses from higher-level applications. In this manner, a central administrator can visually-create deployment templates to enable deployment to millions of devices automatically.

In either case, the thin agent is preferably installed at each device via remote scripting. This agent inspects the device, generates a unique Device ID, Temporary Device Key Pair, and transmits this information to the device's Known Authority endpoint, as shown in FIG. 22.

During a deployment process, either the administrator or the automated use of a deployment template determines where licenses for different systems will be deployed. As licenses are transmitted to different LDCs, the thin agent associated with the LDCs may be updated with a new Known Authority. By default, the Known Authority endpoint is the MDC, but may be changed throughout the enterprise. Lower-level LDCs, including those without licenses, may re-use the upper level KA thin agent to protect deployments throughout the system.

After installation on a particular device, the thin agent submits the device information and its temporary device public key into a request for a full agent. This request is submitted to the Known Authority, which encrypts that transmission with a Temporal Key. The Temporal Key is preferably given an expiration date, which may be provided manually by an administrator or via template, and which limits the timeframe when new devices may be added. Administrators may also limit a Temporal Key by number of devices, device types, communication protocols, time of day, etc.

The LDC also preferably comprises a time server, as part of a Time-Released Encryption (TRE) approach. To this end, the LDC submits its own encrypted cipher that is exchanged with its KA prior to initiating its device discovery efforts. This cipher is encrypted by the LDC with a key it shares with its KA and that encrypted cipher is sent with each Thin Agent and then by the Thin Agent to the KA. The KA for any given local System cannot be any device in the Local System—including the LDC. The LDC and its KA change the cipher value according to TRE algorithms to more tightly secure this deployment process.

If a new device passes the TRE check, and any templated device authentication checks, the Known Authority adds the new device to its Device Registry. Initially the new device may be added as a temporary entry. The temporary registry entry is then sent only to that particular device's LDC to complete deployment. This transmission may be sent with a challenge. As described above, the time server employs time seeds to carefully monitor and store time-sensitive or time-dependent communications to devices in the system. When responding to the request, the LDC preferably returns a new time seed value.

The KA then then generates a permanent Device Key Pair, encrypts the private key of that pair, the full agent installer, the KA public key, the most recent set of policies for that agent, and the LDC's Public Device Key. A second time seed and answer to the challenge may also be provided at this time (separately encrypted with the permanent device key and SALTed with the challenge). This in turn may be encrypted with the new device's Temporary Device Public Key and relayed back to the device. Even in instances where these communications pass through lower level LDCs, those LDCs are unable to decrypt the transmitted information (i.e., they may only pass the information to the target device and not decrypt the information).

Referring again to the challenge, the LDC uses the device's permanent public key to encrypt the challenge, SALTed with the new time seed value, and send that challenge to the device. The device then uses the time seed value and its permanent, private key to decrypt the challenge and decrypt the challenge answer. The device then encrypts the answer, SALTed with the time seed value, with the LDC's device key, and preferably includes an initial Synchronous Session Key prior to communicating the response to the LDC. At this stage, the LDC and the device have established secure communications.

A final piece of information may be added to the device registry: the core blockchain value for the new entry. In embodiments, each entry has a new and old blockchain value (up to 512-bits) but the core entry leaves the old blockchain value blank. Once the device has successfully completed deployment, it may be configured to send its blockchain value to its KA SALTed with the new time seed value. The KA then finalizes the registry and sends the update to every KA in the VPE.

The Device Registry is preferably comprised of three parts—private, protected and public. The private segment comprises the device blockchain value, the full device ID, the hashing algorithm seed value, and the hashing algorithm unique identifier. These values may be encrypted using the device's public key, which means they may only be decrypted using the device's private key. Accordingly, updates may only be made to the device's registry entry with a matching blockchain value. The protected segment comprises the device's application endpoints, operating system and any attributes assigned to that device for purposes of workflow. These values may be encrypted with the device's permanent private key and be accessed by any KA with the device's permanent public key. The public segment includes those aspects of the device that are publicly accessible in the Device Registry, and preferably comprises a muting table-based system. The public segment preferably comprises Known Applications, Device Types and any other routing lookup data as may be defined.

In embodiments, all communications made in the system occur through either a local System Direct Connection or a Cross System Named Connection, each of which are described in detail below. In order to support Cross System Named Connections, the hashed device ID is provided in a public format, preferably along with the name of the LDC controlling that particular device. The LDC information includes the main endpoint data to connect to the LDC. As the Device Registry is routed through the enterprise, the LDC-to-LDC hops required to move from one LDC to another LDC are updated in this entry. To this end, the public section of the device registry supports a muting table-based system, wherein each LDC knows only the next LDC in the chain and only the final LDC knows the device endpoint.

Cross System Named Connections are a preferred type of communication delivered over the VPE, particularly in the case of distributed systems. The systems and methods disclosed herein overcome and, are in many embodiments, agnostic to the different protocols, distance and disparate networks present in an enterprise system, in part by making all connections appear to be local connections. To enable Cross System Named Connections, the system utilizes routing information for each device to provide enhanced connectivity.

In other embodiments, a local device may have an application requiring access to a particular database, or alternatively a range of distributed endpoints running a given application set. For example, certain systems may comprise a distributed Kubernetes model and/or Kubernetes nodes. In this embodiment, the LDC may look up the database process in the Device Registry and enable LDC-based routing for the connection across the enterprise. This particular connection translates into a series of point-to-point encrypted channels from the requesting device to its assigned LDC, and including any intermediary LDCs, and to the target device. At each level, LDCs may execute remediation steps, block communication attempts, change encryption to fit new rules (for example, compliance rules varying by country) and manage distributed challenges while remaining invisible to the application(s). Each endpoint device still maintains its CCL and does so without being concerned with the location of the other device.

In the case of a device comprising a distributed application, the Device Registry may be queried to find all devices that contain a matching application in a given application set. Administrators may further create internal device Communication Control List (CCL) rules, which in turn transform a simple application outbound communication into a secure broadcast request to transmit data to a number of endpoints. Administrators utilizing this process do not need to be concerned about location, identifying networks or other addressing issues. Instead, the workflows for these requests may be visually created and transparent to administrators, to enable focusing on attributes that the administrator(s) define.

As described above, session initiation is one of several processes that may occur between each endpoint, while maintaining aspects of a single ethernet packet. As the system controls all ethernet packets transmitted over the network, times can be extended to prevent lost traffic issues, such as issues due to low latency challenges. The LDC may also be configured to handle load balancing, wherein the LDC manages requests so that a given request is relayed to the closest target application, dependent on the load.

Figure 25:
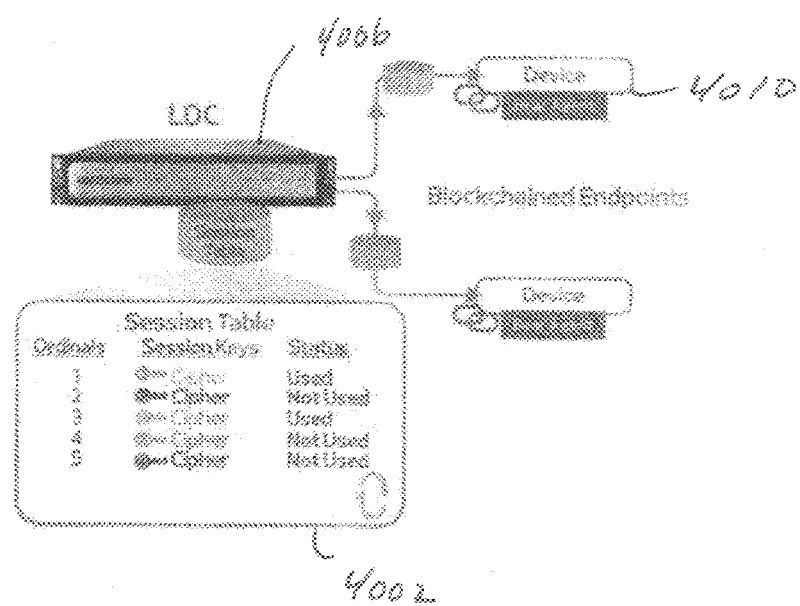
FIG. 25 illustrates aspects of a session table according to embodiments of the present disclosure.

Referring now to FIG. 25, the LDC preferably generates a range of cipher keys and ordinal lookup values within a Local Systems, and places those keys/values in a Session Key table 4002. The LDC 4006 then submits the updated Session Key table to all local devices 4010. The LDC may further be configured to randomly overwrite the Session Key table, such as in response to a majority of keys being used, if a device requests a one-time session key, or as determined (for example, consistent with a policy) by reaching an expiration date. Each device, in turn, receives the Session Key table and may use the ordinal value to establish secure, symmetric encryption for a local application connection. In the case wherein an application residing on one device initiates communications with an application residing on another device, the initiating device will randomly pick an ordinal value from its Session Key table and submit that value to the target device. The target device, in turn, will be configured to query whether that ordinal value has been used or not. If the value has been used, then the device rejects the encryption, such as through an "in use" response. The initiating device may attempt (subject to any policy-defined limit of ethernet exchanges) to establish a secure encryption, and may request a one-time token from the LDC. The LDC, in response, may transmit a new cipher key to each device to facilitate this request.

Once each device has an accepted cipher key, symmetric encryption is instantly established. At this point, each device may be configured to look at its internal Device Registry to see if the endpoint from the other device has been properly registered. Unlike the larger Device Registry in the LDC, local devices may be configured to only require authorized endpoints. To this end, each device may submit an out-of-band request to the LDC to gain approval for new connections. Customer policies may in turn enable ongoing application communications while the endpoint is authorized, or alternatively force a communication block.

In order to ensure proper authentication, each device may send the endpoint information of the other device to the LDC. The LDC may, in turn, verify the endpoint has been registered with the LDC. If the endpoint is registered, the LDC preferably submits an authorized response to the device. If the LDC determines an illicit communication attempt, further remediation workflows can be enabled to isolate the offending device or the offending process on that device.

The device that submitted the authorization request may then use the device type found in the authorized response from the LDC to ensure the communication is allowed and what restrictions, if any, need to be applied to future communications. If the device determines a given connection is in violation, that connection enters a remediation workflow to determine next steps.

When a device agent comes online, there may be a number of identity checks performed, one of which is preferably an endpoint verification process. This step registers all processes (as known to the operating system) and all attempted outbound communications, and may further register any listeners for inbound information. In embodiments, these connections occur at the Ethernet layer.

The local device preferably maintains a secure registry of its own communications and, as each becomes active, the local device first checks the process and communication against its internal CCL. If the connection is allowed, the secure registry is sent to the Known Authority to be registered with the LDC. If the communication is not allowed, a remediation workflow is entered to determine next steps.

In order to update the device's information in the Device Registry, the device generates a new blockchain, decrypts and adds in the old blockchain value and then encrypts it with the KA public key. Separately, the KA randomly changes its key pair and updates all managed devices. The LDC also generates time-based seed values that are distributed on a more frequent basis, called the Temporal LDC Seed. When a device needs to add or remove a connection, or report a policy change/module update, both the device's blockchain value and Temporal LDC Seed are encrypted with the KA Public Key. The KA may then decrypt the new and old blockchain values, generate a new entry for the device, add in an old/new blockchain value and send an acknowledgement, preferably encrypted with the device's public key. The Device Registry (for the device's LDC) is updated by the KA and Device Registry changes are distributed throughout the enterprise.

While the Device Registry serves as a distributed Ledger, the system is preferably configured to deploy a peer-based system to ensure integrity and prevent malicious intrusion into the Device Registry. In this respect, the KA may generate a hash of its Device Registry, and transmit the generated hash to all peer Known Authorities and LDCs in the enterprise. The KA may maintain an internal maximum authorized time before performing a registry verification. When that time expires, the KA requests the hash from all peer devices and checks that hash against a fresh hash of its Device Registry. Depending on the particular rules or policies established by the administrator, if the new internal hash matches a percentage, majority or other predetermined amount of the sent hashes, the registry is verified.

If, however, the hash does not match the predetermined threshold, the KA sends a request to its assigned KA to obtain a verified registry. The requests triggers a similar process described above, whereby the higher-level KA initiates the verification process. This process may continue up the chain until arriving at the MDC, at which time remediation workflows are preferably initiated. Once a KA has a verified registry, it may be configured to push that verified registry to any KA/LDC with a hash that did not match the majority. Optional remediation workflows might also be executed on the minority-reporting KAs/LDCs.

The registry process described above may be extended into a Protected Communications Log (PCL), which serves as a registry for data-in-transit. To this end, all devices involved in a communication are preferably entered into a given row of the registry, along with a reference and/or the actual data being transmitted. A hash of the device IDs may be used to relate any updates. For example, any time the system transmits a policy or module update to a specific device, the devices form a unique hash that is used to link updates together over time. The PCL may also be configured to parse through a peer-based hash verification process independently of the device registry, which may be distributed across all Known Authorities.

Figure 26:
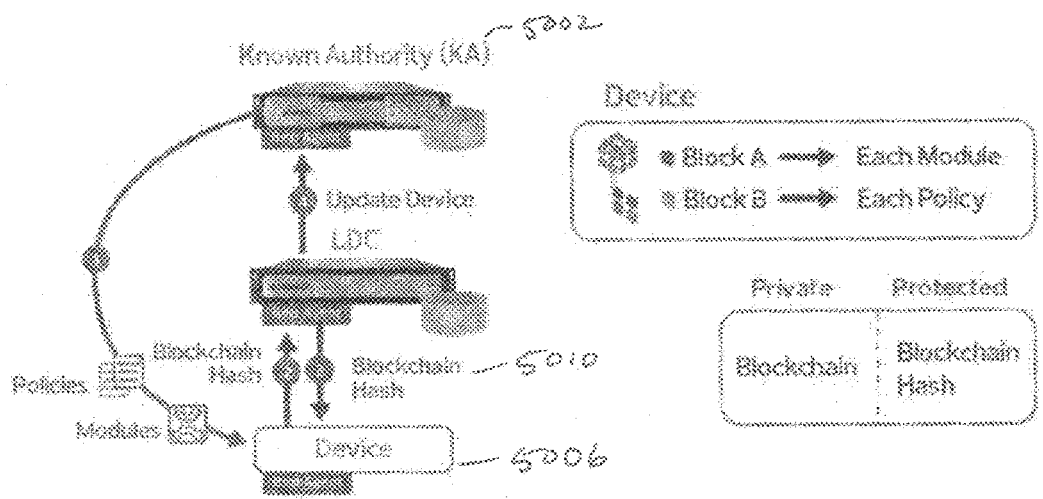
FIG. 26 illustrates aspects of updating modules and policies using blockchain-encrypted communications according to embodiments of the present disclosure.

Referring to FIG. 26, one of the other uses of the blockchain security systems described herein is to secure policy and module updates from a KA 5002 to each device 5006. When enabling this feature, every initial policy and module sent from the KA to the device is preferably seeded with a unique blockchain value 5010. The KA preferably stores these values in a protected section of the Device Registry. When a new policy or module is sent to the local device, the KA embeds a new blockchain value and uses the current blockchain value as a seed to encrypt the policy/module. The KA then hashes the overall delivery package and encrypts that hash with a time-series cipher key. While numerous policy/module updates may be included in a given transmission, only the target device can decrypt the actual delivery package. The local device, upon receipt of the delivery package, uses the current blockchain value to encrypt a request to its KA for the times-based cipher key to decrypt the hash. The local device then hashes the delivery package and compares its hash to the hash from the KA that has been decrypted.

If the hashes match, then the local device uses the current blockchain to decrypt the policy/module and replace the old blockchain value with the new value, which is included in the update. The local device then uses the new blockchain to encrypt a response back to the KA and thereby report that the update was successful.

The KA then records the update in the PCL as previously described. The KA also maintains a hash of each device's combined blockchain values in the public section of the device registry, which is referred to as the Device Blockchain Hash.

Figure 27A:
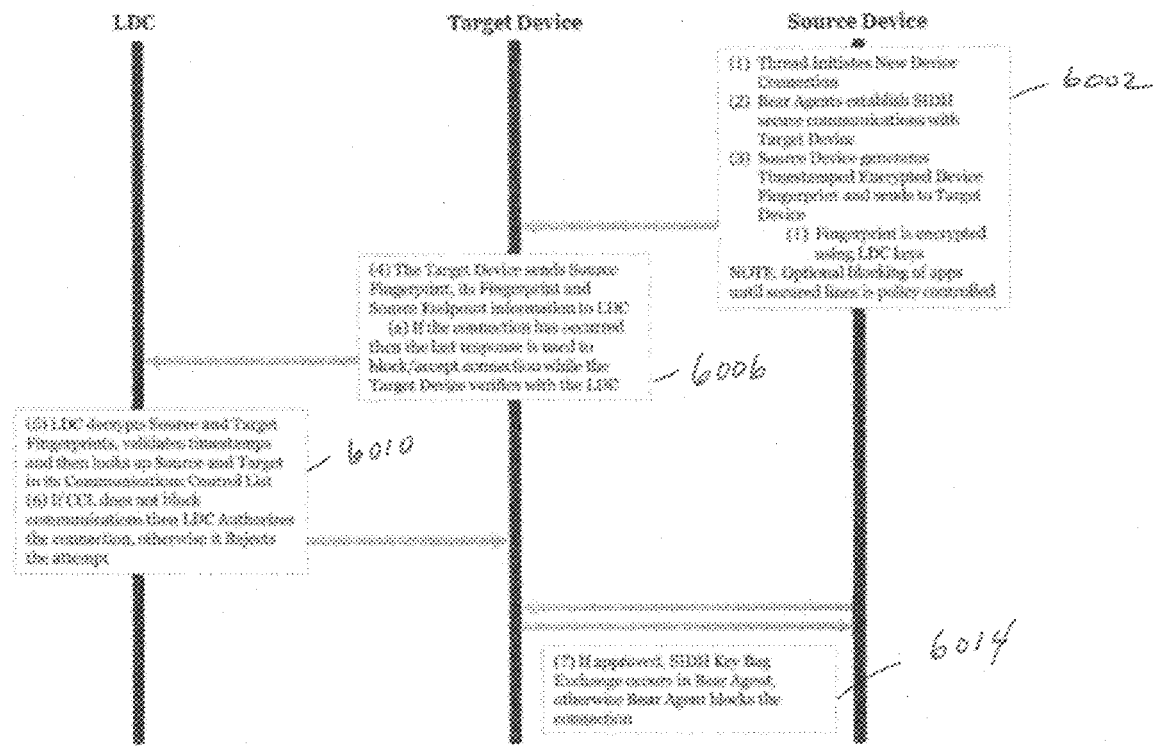
FIGS. 27A-27B illustrate workflow processes for initiating local and remote device sessions according to embodiments of the present disclosure.
Figure 27B:
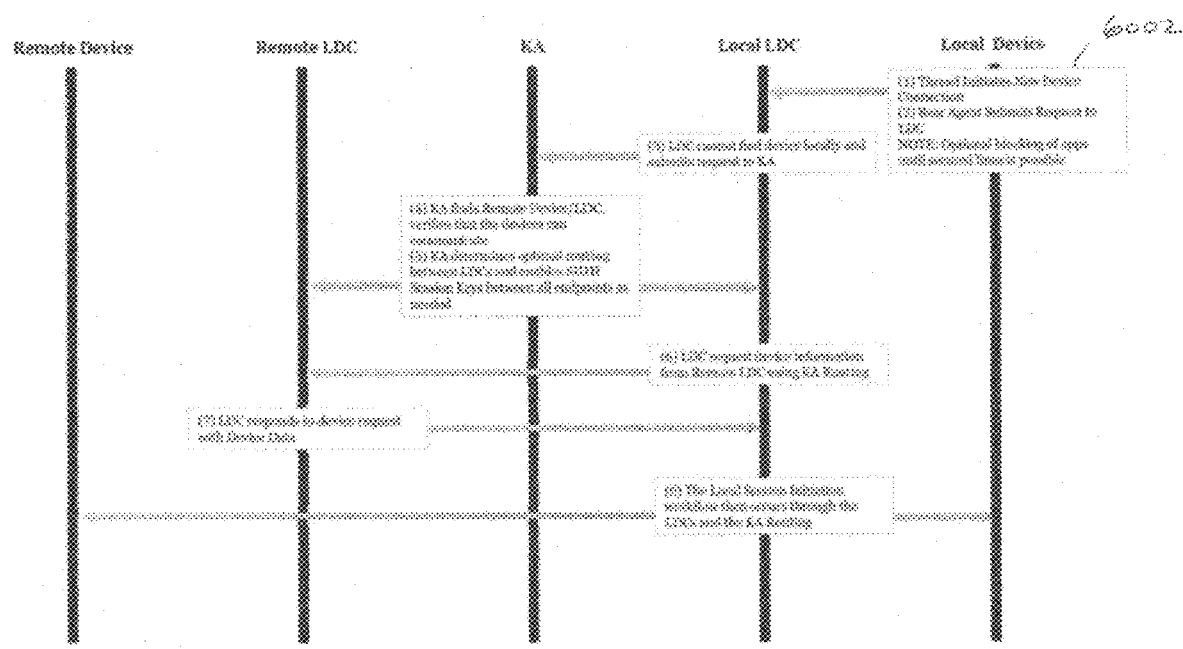

Referring to FIGS. 27A-27B, processes for local and remote session initiation are shown. In FIG. 27A, the process for local session initiation is shown. Here, a source device may generate a new thread by initiating a new device connection 6002. The device agent installed on the source device may establish a SIDH secure communication with a target device. Next, the source device generates a time-stamped encrypted device fingerprint, and sends the same to the target device. In embodiments, the device fingerprint is encrypted using one or more complete or partial LDC-issued keys. The target device sends the source device fingerprint, the target device's own fingerprint, and the source endpoint information to the LDC 6006. If the connection is made, then the last response is used to block or accept the device connection while the target device verifies status with the LDC. The LDC then decrypts the source and target fingerprints, validates the timestamps and looks up the source and target devices in the Communications Control List 6010. If the CCL does not dictate the system should block these device communications, the LDC authorizes the connection. Otherwise the LDC rejects the attempted communication. If approved, the SIDH Key Bag Exchange may occur via the device agent 6014. If not approved, the device agent is configured to block the connection. A similar process is shown for remote session initiation in FIG. 27B.

Every peer device in a local system assists in ensuring policy integrity of every other device, preferably leveraging the same hash-based peer enforcement model described for the Device Registry. In embodiments, each device hashes its current policies and modules and sends that hash to its peer devices. As with the Known Authorities, when a random maximum time expires, the local device requests the hash (es) back, compares its hash to the majority and then takes appropriate next steps. While these next steps may leverage remediation workflows, additional options include requesting new policies/modules from the KA, uninstalling the device agent, installing the thin agent and commencing registration again. As with reporting LDCs and Known Authorities, any peer devices reporting a minority hash are preferably compelled to go through their own hash-based agent verification process.

While the KA blockchain-protected push of policies and modules enables device integrity, the devices may be configured to always have the correct versions of their policies and modules for continued operation. In this embodiment, the LDC may randomly request each device to send a hash of its current blockchain values. The LDC compares these values to the Device Blockchain Hash in the registry. If the hashes do not match, the LDC will first ensure it has all updates from its KA and then it will request the KA to send new updates to the local device. Depending on remediation options, the local device might be given a certain amount of time to update itself or be isolated until its hash matches the Device Blockchain Hash.

Another approach is to have each KA validate the known hashes as part of the response for a new connection request between devices. The endpoint devices may then request the blockchain hash from the other device and submit that value to the KA. Matching values enable the connection, whereas non-matching values would result in the process described above.

One important aspect of the system and method described herein is the storage of public device keys, which are used to access protected device registry information. Each LDC can store entire keys in protected memory, however, the physical storage of these keys occurs in a fractured pattern to protect against intrusion. One an LDC initializes, one of its first steps is to recreate the keys for its local devices, then reestablish communications with those devices (similar to the process during final phases of device registration). If a public key is lost/corrupted, that device is required to go through registration again. Redundant key parts are stored in a distributed manner throughout the enterprise.

Figure 28:
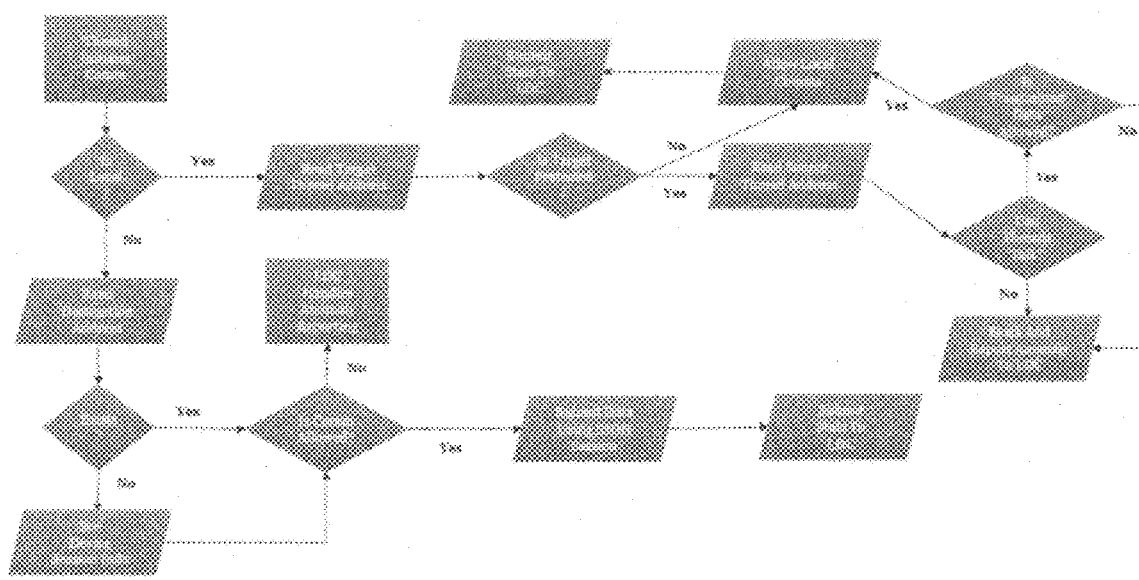
FIG. 28 illustrates aspects of communications among applications within the system according to embodiments of the present disclosure.

Application-based communications enjoy the benefits of rotating packet-level encryption and peer-to-peer authenticated endpoint transmissions. Responsive firewalls can extend this protection, but in certain embodiments the system provides even greater protection. In embodiments, the system transmits all internal communications through a virtual ethernet channel, which may be configured to run a separate policy (i.e., a policy not controlled by a customer or client). This channel may be virtual as it flows over the lines of communication already in place for other applications. The system in this embodiment does not require any additional ports to be opened. Instead, the system leverages its own protected headers in each encrypted payload to identify pertinent packets. Application-based communications are illustrated in the flow chart of FIG. 28, which depicts various steps and routines that may be encountered during such communications.

In one example, whenever a device agent reads a packet, that packet is placed outside of normal communications and sent directly to the main device agent system. To this end, while data does travel over the same lines of communication, the data is never read by any protected systems. Moreover, no processes running on a device may intercept, or even see, these virtual packets. The system may be configured to continuously modify how packets are identified, change channels if practical, and send different packets across multiple channels to further complicate interception of the packets. The packets resemble any other packet on a given line of communication, albeit with its own unique encryption.

By removing the authentication and verification of endpoints from the exchange of information, the present systems and methods transform heavy processing paradigms in blockchain to lightweight, continuous protection mechanisms, while independently securing all devices, constantly enforcing the identity and integrity of those devices and using unique encryption on every line of communication between every device. These systems leverage a partitioned, distributed ledger system to determine device membership, authorized communications and to record events across a virtual private network. Additional layers of peer-based verification and time-series-oriented deployment are provided simultaneously.

Embodiments described herein may further include randomly-generated values, optionally stored in a trust zone, in order to achieve security requirements. Any aspect of a device that is not subject to random changes can be leverages including, as one example, a hash of the device agent's libraries.

The system may require that any relatable device ID can be re-generated at a second time period in order for validation to occur. In certain embodiments, the device ID must be identical for matching purposes, whereas others might use a time-series to achieve correlative matching. Even others might use known, or expected, changes within a device to calculate the new device ID based on those changes and the original device ID.

Certain components of the system and method are described above and are further elaborated upon below. The device agent, for instance, is a logical construct that handles both the virtual communications kernel and any other interactions required for a device to function within this invention. The local system may comprise an internal security/policy engine configured to monitor packet flow and transmission of critical data. As each device agent establishes secure communication with the LDC, and as the LDC has the ability to send updates to all devices associated with the local system, only authorized peer device communications may be allowed depending on the embodiment. Further illustration of these principles is provided in the following paragraphs.

In embodiments, the device agent(s) facilitates communications with devices in the local system. Preferably, each device in a local system is configured with at least one device agent through a process that is invisible to, and in certain embodiments precedes the activation of, other systems and applications. In certain embodiments, the device agent is installed as a driver or otherwise as a no-UI application; as a pre-Boot or chip-based process resides outside of the operating system; as a new BIOS alternative; as a user mode application with access to low level communications or some other variant as required. This allows the device agent to acquire and process packets logically outside of an operating system, and preferably in a low-level application. The acquisition of packets may be achieved through a "shim" (i.e., NDIS for Windows-based applications or IP Tables for a Linux-based application) configured to grab packets before they exit or as they enter the kernel, as described below.

The device agent also preferably comprises an internal self-check protocol to ensure that a device key or device ID is valid, or to ensure that the latest version of any policies/modules maintained by the LDC are enforced for all peer-based communications.

While each device agent, in certain embodiments, is configured to immediately establish a secure connection with the associated LDC, the domain database of the LDC may also communicate and send updates (for example, via BUS commands) to other domain databases located outside the LDC. The LDC may be installed on either a new device or an existing device. In a preferred embodiment, the LDC facilitates out-of-band communications by way of a filter, which is specially configured to filter application traffic and undesired packets from the LDC. The filter in one embodiment is configured to apply only to specific packet characteristics, such as TCP/IP header value, source IP, port, etc.

The device agent may be provided as a software element that runs without a UI at the very bottom of every device. The device agent may be configured to manage all communications (as data flows) to and from any connected network. All data is communicated via a connected network, and is preferably encrypted as it leaves a device. The data may be decrypted during transmission to the intended destination, while remaining invisible to applications and systems. The device agent preferably requires no additional lines of communication and works across all types of existing network connections.

The device agent may comprise one or more workflow engines that are controlled through policies sent from the virtual application. The agent manages the device ID, a full range of security options, where and how a device communicates, and remediation efforts. The device agent may be configured to manage what processes are running, the configuration of those applications and device function. The device agent preferably monitors and logs all device activity of interest and normalizes data at the point of collection. This data normalization enables truly device-agnostic management, protection and AI-based automation.

In another embodiment, the LDC is configured to inject a unique identifier into each packet payload, thereby creating a virtual band for communications routed by the LDC. The LDC may be coupled to a virtual management module that may further provide a visual interface, and which may further comprise one or more engines, such as a policy engine or threat analytics engine. Additional engines and/or modules may be provided with the LDC, including those described in detail below.

In embodiments, all transport protocols (Ethernet, Wi-Fi, Bluetooth, OTA, Satellite, etc . . . ) interoperate within a secure communications layer, and the system may run in many different manners in order to effectively adapt to various device limitations. The two main aspects of these types of deployments are as a kernel driver inside of an operating system (OS) or outside the OS either from a chip or via a BIOS update package.

Another novel aspect of Applicant's system is that it is architected into a series of Local Systems that communicate asynchronously in an intermittently connected manner. A Local System is defined as one Local Domain Controller (LDC) and any devices directly connected to that LDC. Local Systems may be constructed as standalone systems that operate based on one or more blockchain-protected set of policies. The agents are all constructed of workflow engines and the policies provide all behavioral instructions. In this manner, the system is able to run in a completely disconnected state and then instantly update operations as new policies become available.

The system is also focused on device identity and integrity in these isolated systems. Leveraging peer-based integrity checking options, the system continuously verifies the devices in a Local System as well as their policies.

Applicant's novel system further provides a small driver at the core of every device—from an IoT sensor to a 5G radio tower to a cloud server—and invisibly provides a complete stack of security, which may comprise numerous deployment options both inside and outside of an operating system and completely invisible to applications and users. By providing a unique software agent within each Local System, users enable a range of protective options in a highly scalable architecture, including but not limited to lightweight blockchain security, isolated system resiliency, and behavioral-based threat detection.

Whereas other products end with detection based on historical metadata, the present system models active threats to determine how that threat works over time. Then, at the level of each Local System, machine learning determines the local behavioral profile for each device within that local system. The Local Device Behavioral Profile, for example, is a dynamic and living process with continuous interactions both within and across the system(s). At any moment in time, a machine-learning subsystem is programmed to identify and store the boundaries of normal device behavior for each device in a Local System. Any abnormal behavior is instantly identified, isolated, and if possible, remediated.

When an attack is identified, the remediation workflow for that attack are either pre-loaded or automatically loaded directly on the endpoint device. Alternatively, these workflows may be stored on the Local Domain Controller. In either case, threat isolation occurs based on abnormal behavior, the abnormal behavior is matched locally to a known remediation workflow, and then the workflow runs—removing the threat—all without disrupting the normal operations of the impacted device.

A key differentiator to the present system is inspecting abnormal behaviors in device communications, operations and health metrics in individual device processes. By inspecting behavioral components—instead of trying to expand generic or static patterns through the noise in only a single class of device behavior—the machine learning subsystem greatly increase its ability to find similar threats.

For example, if a threat is sufficiently different, the top-level AI system takes over. At this point, administrators may visually work with the top-level AI to more rapidly identify a solution. The AI is configured to ingest all of the anomaly information, including contextual data, and determines what aspects, or signals of activity, are the most important. The AI then uses these signals to match against other signals and attempt to match new threats against prior threats.

The system also provides a range of remediation options, and the AI described above may use those options to learn more about an anomaly and make real-time changes. The system may include AI specifically configured to learn how the process responds when it: loses connectivity; or if the process stops responding to a user; or what the process does when it ingests intentionally provided or "honey pot" information. This AI may continually modify and inspect the anomaly to determine what it is and how to overcome it from a behavioral perspective, and not just through static metadata.

One of the main aspects of the system is providing users/administrators with visual remediation tools, which in turn permit non-cybersecurity experts to run various workflows based on operational parameters. These parameters include memory, network and processor loads, power cycle impacts and even issues such as applications outages or forced user logoffs.

The system preferably leverages training simulations to determine the impact to different device constructs and to transform administrator Remediation Tools into Visual Operations Remediation Tools. The operational impacts are tied to specific device constructs and, as needed, even to a specific Device Network Construct.

In embodiments, once the system detects an abnormal process, or set of processes, that device can instantly isolate the process. To understand this process, it is important to note that the unique agent described above sits on every device and protects managed threads from a range of possible exploits.

A Dynamic Thread Protector module may be incorporated in a Secure Kubernetes system. Applicant's system has the ability to manage Kernel Operations and, through that, I/O, memory and processor interactions, similar to how virtualization managers operate although those are scaled for grid computing architectures. The system monitors kernel operations, but does not interfere unless a specific process exhibits abnormal behaviors. At that point, the system can virtualize the various resources leveraged internally by the suspect process.

Once virtualized, the agent reaches out to the LDC for possible remediation responses. Any known exploits will have local remediation workflows in place and can be overcome in real time. "Zero day" exploits might not be known, but can be inferred by using the machine learning subsystem and fuzzy/correlative matching, depending on policy.

In these embodiments, an unknown thread can be held in a suspended state in order to freeze its responses in place. When the thread is resumed, any indicators of suspension (e.g. computer time) can be virtualized such that the thread has no indication of such a change. The abnormal thread can also be allowed to run within constraints—for example no encrypting of files—and all communications can be transparently trapped or sent to a remediation center or a known dark net. Finally, if indicated, the thread can be cloned in a suspended state and then moved to another virtual device that simulates the original device.

Critically, the rest of the device's operations are not impacted during this remediation processing. Simply attacking a device with most modern cybersecurity, especially agentless options, results in device/network isolation and massive disruption. Applicant's isolation system avoids incurred costs stemming from such exploit attempts.

In certain embodiments, the present system may be utilized for protecting, by way of example but not limitation, devices connected to one or more local system. In these embodiments, a local system (i.e., any subnet and the devices local to that subnet) comprises at least one LDC. A subnet can be defined as a network of connected devices wherein all connections are local. Alternatively, a subnet may be more logical such as is the case when a cloud is used to connect directly with other devices across a possible range of locations. The LDC may be comprised of one or more databases, such as a domain database, a device agent, and a virtual management module.

The system may also be configured to operate in connection with an event bus or equivalent bus-based command and control system. In embodiments, the event bus, or other commands and control or replication system, is configured to send and receive data between local systems, or alternatively between known devices in a local system. In embodiments, an event manager distributes messages (command and control) to separately update the LDC database. Alternatively, the event manager may communicate directly with a specific device or a device agent. The event bus topology enables the event manager to receive and distribute messages (binary or text). Simultaneously or near-simultaneously, the virtual management module records the transmission of messages and any errors that are received by the event manager. Messages that are sent are preferably encrypted, as described in greater detail below. Other embodiments might rely on database-level replication systems which can, optionally, utilize the virtual communications kernel to secure the transmission of data.

During communications with any devices on the local system, each device may establish a connection with the LDC, in the first instance, via the device agent. These are referred to as "LDC First" communications. Alternatively, or in addition to LDC First, peer-to-peer device communication may occur by each device obtaining a "ticket" from the LDC, and each transaction is recorded in the domain database. This serves as a transaction ledger within the LDC, which in turn allows the LDC to modify a device ticket at any time.

For example, a first device may obtain a device ticket from the device agent. Simultaneously or sequentially, a second device may obtain a separate device ticket from the device agent. According to one embodiment, the first and second devices may exchange the device tickets obtained from the device agent, and may further authenticate the device tickets exchanged with the LDC. In this manner, both the first and second device communication paths may be verified by the device agent, and further data security policies may be applied, such as the security policies described below. Some embodiments utilize one device ticket for all device communications, whereas other embodiments require a separate ticket for each communication interaction. These latter embodiments are advantageous for simplifying distributed ledger transactions as each entry can be quickly identified by the device tickets involved.

The communications routed through the LDC are preferably all encrypted using a specially configured blockchain-based encryption protocol. Modern blockchain efforts attempt to authenticate users, devices and transactions all in one interaction. This approach is supposed to maintain anonymity between devices and users while still securing the actual transaction. In order to obtain this protection, extremely complex mathematical equations are utilized, which is not advantageous to certain device environments.

In contrast, the current invention provides embodiments wherein the devices are authenticated independently, and preferably prior to any transactions. In certain embodiments, this type of secured communications can occur between an exemplary requesting device and an LDC. In these cases, the requesting device will have been provisioned with a local LDC public key, as described in subsequent sections, as well as a number of optional encryption options through a modulation chart optionally nested within a CCL. The requesting device will then generate a random shared session secret value and use the LDC public key and one of a possible plurality of encryption options to encrypt that shared session secret. Separately, the requesting device will encrypt its device ID, to be described in a subsequent section, with its device private key. The encrypted device ID, encrypted shared session secret and the ordinal reference to the encryption used for both are then, in certain embodiments, transmitted to the target LDC.

The LDC will use its private key and the ordinal reference to the appropriate encryption process to decrypt the shared session secret and the requesting device's public key to decrypt the device ID. Certain embodiments will perform a lookup to ensure that this device type, or even device itself, is allowed connectivity using options (such as through a CCL). If communications are authorized, the LDC will encrypt its LDC device ID with its private key and transmit that along with optional ordinal value for the communication policy selected and, as a further option, the encryption approach selected within the selected policy to encrypt the LDC ID. The requesting device will then optionally use those ordinal references and its LDC public key to decrypt the LDC ID to verify the correct LDC connection. At this point, in certain environments, the shared secret key will be used to transmit an optionally new ordinal value for long-running communications.

Other embodiments will use the shared secret key to encrypt and decrypt the LDC ID, thereby saving a step. In these embodiments, the shared session secret is used as a way to launch long-running communication protection, through such options as modulation charts, rotating encryption keys and so forth. Then the shared session secret is, in some embodiments, discarded. Other embodiments will modify the shared session secret over time using distinct modulation sequences to enforce ongoing, out-of-band, challenge response efforts.

For the purposes of streamlining explanation, one set of embodiments might utilize an initiating device and a target, or recipient, device. To this end, the initiating device may select, randomly or according to some set of rules or filters. In these embodiments, the initiating device may utilize encryption security key generation rules to create a variable number of encryption keys. These rules may control such options as the minimum and maximum number of keys to generate, the minimum and maximum size of each key and the algorithm(s) to use when creating these keys.

In certain embodiments, the generated keys will be sent to the target device over an existing secure line of communication, such as the type described previously. At this point, each device will know the ordinal position of each key in the set. Depending on the embodiment, either the initiating or recipient device will then generate a random list of possible ordinal values. Some embodiments will enforce rules such that each encryption key can only appear a minimum and/or maximum number of times in the ordinal set of values, cannot be placed next to one another, have to appear next to one another and so forth. The key generation rules might also be broken down into subsets such that different keys of different minimum and maximum sizes are created. Rules for generating ordinal values might then include restrictions based on the size of keys and even the algorithm used to generate different keys.

Once the ordinal values are generated, the generating device then securely transmits the ordinal set to the other device. In these embodiments, the devices can then use the ordinal values to determine what key to use for each packet as those packets are processed. This approach enables each packet to be protected with a unique key that can be different from other packets. Certain embodiments will use the ordinal values and/or the keys once and then re-generate both. Other embodiments will continuously use both the keys and ordinal values and may or may not re-generate both at regular or random intervals or in response to external factors ranging from throughput levels to retransmission rates to active user device application construct changes. Keys and ordinal value sets can be independently altered or altered in sync depending on the embodiment. The same or different key generation and ordinal value rules can be used to create one key/ordinal value set for all device communications, one for each type or communication (divided by protocol, destination, application and so forth) or some hybrid therein.

Key and ordinal value generation rules may be contained in an encryption set and there may be more than one encryption set depending on the embodiment. These sets can be changed according to a number of options as described in prior sections. Changing an encryption set may or may not cause an immediate change in keys and ordinal sets, depending on the embodiment, as certain embodiments might use the replaced encryption set's interval to determine when to switch keys and ordinal values to the new encryption set.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A blockchain-enabled system for enhanced, secure communications among a plurality of devices in communication over a local system, comprising:
    at least one main domain controller (MDC);
    at least one Known Authority;
    the at least one main domain controller associated with at least one local domain controller (LDC);
    the at least one Known Authority associated with the at least one local domain controller (LDC)
    a plurality of devices in communication over a network associated with the local system;
    a vBear module comprising at least one device agent, the vBear module configured to implement one or more encryption policies for communication threads between the at least one local domain controller and the plurality of devices;
    a blockchain-enabled device ledger maintained by the at least one local domain controller (LDC);
    wherein each device of the plurality of devices requires registration and validation from the at least one Known Authority;
    wherein the at least one Known Authority operates through the at least one local domain controller (LDC) to control and command devices on the local system;
    wherein the vBear module is further configured to operate on the at least one main domain controller (MDC), the Known Authority and the at least one local domain controller (LDC);
    wherein the at least one device agent generates a challenge in response to a request to the at least one Known Authority for registration and validation from each device, wherein the at least one device agent communicates a message with the challenge to each device from the at least one Known Authority, wherein the at least one device agent compares the challenge received from the at least one Known Authority to the challenge generated for each device, wherein each device is registered and validated only when the challenges match, and wherein the at least one local domain controller (LDC) adds each device receiving a challenge match to the blockchain-enabled device ledger.

2. The system of claim 1, wherein the vBear module is in communication with a datastore local to the local system, and wherein the datastore only contains information at a specific level of the at least one local domain controller (LDC) and below.

3. The system of claim 1, wherein each device of the plurality of devices in the local system operates at least one device agent, and wherein each device agent establishes a secure communication channel with the at least one local domain controller (LDC).

4. The system of claim 3, wherein each of the at least one device agents are not visible to other systems and applications in the local system.

5. The system of claim 1, wherein the vBear module records the transmission of messages and errors received during communications between or among the plurality of devices.

6. The system of claim 5, wherein the messages comprise a 32-bit Universally Unique Identifier (UUID) key for encryption by the vBear module.

7. The system of claim 5, wherein the messages are encrypted by Supersingular Isogeny Diffie-Hellman (SIDH) key exchange and key encapsulation.

8. The system of claim 1, wherein the Known Authority performs a decryption routine to decrypt the encryption policies implemented by the vBear module.

9. The system of claim 6, wherein the 32-bit Universally Unique Identifier (UUID) key further comprises at least one Device Install Key (DIK).

10. The system of claim 1, wherein the at least one device agent is configured to generate an alert when unknown data is received by the plurality of devices, and wherein the alert is sent to the at least one Local Domain Controller (LDC).

* * * * *